(12) United States Patent
Narushima

(10) Patent No.: US 6,633,410 B1
(45) Date of Patent: Oct. 14, 2003

(54) PRINTER FOR PRINTING VISUALLY EQUIVALENT IMAGES RELATIVE TO DISPLAYED IMAGES

(75) Inventor: Toshio Narushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/379,760

(22) Filed: Aug. 24, 1999

(30) Foreign Application Priority Data

Aug. 26, 1998 (JP) ............................................. 10-240476

(51) Int. Cl.[7] ............................. G06F 3/12; G06F 13/00
(52) U.S. Cl. ........................................ 358/1.9; 358/501
(58) Field of Search .................................. 358/1.15, 1.9, 358/501, 504, 505, 515, 518–520, 524–530; 345/581, 589–593

(56) References Cited

U.S. PATENT DOCUMENTS

| | | | | |
|---|---|---|---|---|
| 5,285,296 A | * | 2/1994 | Komooa ..................... | 358/518 |
| 5,894,546 A | * | 4/1999 | Yoshida ..................... | 395/117 |
| 5,909,291 A | | 6/1999 | Myers et al. ............... | 358/523 |
| 5,926,285 A | * | 7/1999 | Takahashi ................... | 358/296 |
| 6,320,668 B1 | * | 11/2001 | Kim ........................... | 358/1.1 |
| 6,385,350 B1 | * | 5/2002 | Nicholson et al. ......... | 382/309 |

FOREIGN PATENT DOCUMENTS

| | | | | |
|---|---|---|---|---|
| EP | 0 556 133 | 8/1993 | ............. | G03F/3/10 |
| EP | 0 684 728 | 11/1995 | ............ | H04N/1/60 |

\* cited by examiner

*Primary Examiner*—Gabriel Garcia
*Assistant Examiner*—Douglas Tran
(74) *Attorney, Agent, or Firm*—Frommer Lawrence & Haug LLP; William S. Frommer; Gordon Kessler

(57) ABSTRACT

A printer makes the quality of an image displayed on a display device and that of an image printed by the printer visually equivalent relative to each other. It is determined if each of the pixel values of the first digital image data input from a image data input section is found within a predetermined data range or not by a predetermined judging method in a printing output processing section, a display device processing section and a video signal processing section and, when it is determined that the pixel data value is not found within the predetermined data range, a predetermined processing operation is carried out on the pixel data value to make it found within the predetermined data range and the image data are used in a image printing section and a image display output section for printing and displaying images, respectively.

11 Claims, 19 Drawing Sheets

PRINTER FOR PRINTING VISUALLY EQUIVALENT IMAGES RELATIVE TO DISPLAYED IMAGES

BACKGROUND OF THE INVENTION

1. Field of the Invention

The present invention relates to a printer and, more particularly, it relates to a printer adapted to minimize the difference in the color tone and the contrast between an image displayed on a display device and a corresponding picture printed by the printer.

2. Prior Art

Conventionally, methods as described below have been popularly used to print a picture that may more often than not be a natural scene.

With a first method, a general purpose computer connected to a printer will also be connected to input devices for receiving image data and the image data read by the computer from each of the input devices are subjected to a predetermined processing operation to produce printing data, which printing data are then input to the printer in order to make the latter print an image on the basis of the printing data it receives. The input devices may include one or more than one removable medium drives, an NTSC (National Television System Committee) video signal input substrate, a silver salt film scanner and a digital still camera.

With a second method, input devices typically including a digital still camera and an original reader/scanner are directly connected to a printer without a general purpose computer interposed therebetween and printing data input through each on the input devices are applied to the printer in order to make the latter print an image on the basis of the printing data it receives.

Now, the first method will be discussed in greater detail. With this method, a system as illustrated in FIG. 1 of the accompanying drawings and principally comprising a host computer (hereinafter referred to simply as computer) 1001, a printer 1002 and an input device 1003 will be used.

The input device 1003 may be a removable medium drive (where the removable medium may be a read-only optical disk such as CD-ROM or a writable magneto-optical disk such as MD-DATA) drive, a video signal input device (where the video signal may be an NTSC signal, a PAL (Phase Alternation by Line) signal, an RGB signal or an S-terminal signal), a digital still camera, a silver salt photograph film scanner(where the film may be a 35 mm film or an ASP film containing magnetic data related to an image) or an original reader/scanner.

The printer 1002 may typically comprises a printing head 1004 for actually printing an image and a head drive circuit 1005 for driving the printing head 1004.

The computer 1001 may typically comprises an interface 1006 to be used for receiving image data by way of the input device 1003, a data processing section 1007 for processing the input image data as printing data and a bidirectional printer interface 1008 for outputting the printing data to the printer 1002. The data processing section 1007 is provided with a device driver adapted to control the operation of the input device 1003, a printer driver adapted to control the operation of the printer 1002 and application programs for controlling the operation of receiving and processing image data and that of outputting printing data. The data processing section 1007 is driven by the application programs to carry out its data processing operations.

On the other hand, the computer 1001 is typically provided with a display device 1009 operating as man-machine interface and a command device 1010 for externally entering a command such as a mouse or a keyboard. Additionally, said computer 1001 is also provided with an image memory 1011 such as a hard disk for storing the image data entered through the input device 1003.

Thus, all the above listed elements will be connected as the input device 1003 is connected to the interface 1006 in the computer 1001 and the bidirectional printer interface 1008 in the computer 1001 is connected to the printer 1002.

The operation of printing an image with the first method proceeds in a manner as described below. Firstly, the input device 1003 is driven to operate by way of the interface 1006 for entering image data by driving the application software of the computer 1001 and the device driver of the input device 1003 so that the entered image data will be read by the input device 1003 under the control of the computer 1001. Thus, the entered image data enter the computer 1001 by way of the interface 1006.

Then, the application software of the data processing section 1007 carries out an image editing/processing operation on the image data entered to the computer 1001 according to the command externally entered through the command device 1010 for the user. If the operation of processing the image data involves arithmetic operations, the data processing section 1007 in the computer 1001 also carries out necessary arithmetic operations in order to process the image data satisfactorily for the user.

Once the image editing/processing operation is carried out to the satisfaction of the user to define an image to be printed, the image will then be actually printed. More specifically, the application software carries out an operation of processing the data necessary for printing the image by means of the data processing section 1007, controlling the printer driver, in order to convert the data into printing data that can be accepted by the printer 1002. Note that the computer 1001 is aware of the condition of the printer 1002 as the latter is feedback to the computer 1001 by way of the bidirectional printer interface 1008.

The printing data obtained as a result of the above converting operation is designed to take the form of a printer control instruction and transmitted to the printer 1002 by way of the bidirectional printer interface 1008. Then, the printer 1002 drives the printing head 1004 by means of the head drive circuit 1005 according to the printing data contained in the printer control instruction it has received and prints the image on a recording medium.

FIG. 2 of the accompanying drawings schematically illustrates an arrangement that can be used to process the data in the above operation. In FIG. 2, the slashes on the lines indicating flows of data denote respective 8-bit/color data. The RGB image data input to the image data input section 1012 of the computer 1001 are then transmitted to the image data processing section 1013 and subjected to necessary processing operations there. If necessary, they will be retained in the image memory 1011 as image file 101 la. The RGB image data will then be transmitted from the image data processing section 1013 to the printer driver 1014 that controls the printer 1002.

The printer driver 1014 principally comprises an RGB-CMY converting section 1015 for converting RGB image data into CMY printing data, a color correcting section 1016 for carrying out necessary color correcting operations, a black extracting/underlying color removing section 1017, an output gamma correcting/tone modifying section 1018 and a sharpness modifying section 1019 adapted to process edges of the image.

Thus, the RGB image data transmitted from the image data processing section 1013 to the printer driver 1014 are firstly converted into CMY printing data and corrected for colors before they are converted into printing data containing data for black (printing data for black are denoted by K in FIG. 2), which data are then corrected for the characteristics specific to the printer and processed for edges. The obtained corrected data are then transmitted to the printer 1002. Note that, if the printer 1002 is a binary printer such as an ink jet printer adapted to reproduce the image as a function of presence of absence of each of a predetermined number of printing dots, a binarizing section will have to be arranged downstream relative to the sharpness modifying section 1019 of the printer driver 1014. On the other hand, the use of such a binarizing section will not be necessary if the printer 1002 is of a type adapted to express the tone of the image by means of the printing dots such as a sublimation type printer.

The printer 1002 comprises an output characteristics converting section 1020 for correcting the output characteristics of the printer and suppressing variances in the printed image attributable to the printer, a head drive circuit 1005 and a printing head 1004, which are already described above.

Thus, the CMYK printing data transmitted to the printing 1002 from the printer driver 1014 are sequentially fed to the head drive circuit 1005 and the printing head 1004 by way of the output characteristics converting section 1020 so that an image will actually be printed out.

Now, the second method will be discussed in greater detail. With this method, a system as illustrated in FIG. 3 of the accompanying drawings and principally comprising a digital still camera 1021 and a printer 1022 will be used.

The digital still camera 1021 principally comprises an image pickup section 1023 for picking up an image of an object, a command device 1024 for externally receiving commands for the operation of the shutter and so on, an image memory 1025 for temporarily storing the data on the picked up image, an image data processing section 1026 adapted to carry out necessary data processing operations and a display device 1027 for displaying the picked up image.

On the other hand, the printer 1022 comprises as principal components thereof an output characteristics converting circuit 1028 for correcting for correcting the output characteristics of the printer, a head drive circuit 1005 for driving the printing head 1030 and a printing head 1004 for actually printing images.

The digital still camera 1021 is connected to the printer 1022 by way of a wire so that the image data produced by the digital still camera 1021 may be transferred from it to the printer 1022 directly or after having been transformed into printing data in the form of digital signal or analog video signal obtained by transforming the digital signal. Alternatively, the image data may be transferred wirelessly typically by means of Ir-DA.

The operation of printing an image with the second method proceeds in a manner as described below. The image pickup section 1023 of the digital still camera 1021 takes in an image signal of the object to be shot in a ready state before the user actually depress the shutter to shoot the object and the image data processing section 1026 carries out certain correcting operations on the characteristics of the image pickup section 1023 and the shooting conditions for the image signal. Thus, an image obtained by carrying out the above correcting operations is displayed on the display 1027 so that the user can see the object to be photographed in the frame of the display device of the camera. If the display device 1027 is replaced or used with an optical viewfinder, the user can see the object to be photographed in the frame of the viewfinder.

As the user operates the command device 1024 that may be a shutter, the camera starts an image pickup operation. As the shutter is depressed to start the shooting operation, the image data taken in by the image pickup section 1023 and subjected to correcting operations on the characteristics of the image pickup section 1023 and shooting conditions by the image data processing section 1026 are stored in the image memory 1025. If necessary, the image data may additionally be subjected to data compression by the image data processing section 1026.

FIG. 4 of the accompanying drawings schematically illustrates an arrangement that can be used to process the data in the above operation. In FIG. 4, the slashes on the lines indicating flows of data denote respective 8-bit/color data. The RGB image data obtained by the image pickup section 1023 of the digital still camera 1021 are then transmitted to the image data processing section 1026 and subjected to necessary processing operations there. If necessary, they will be retained in the image memory 1025. The RGB image data will then be transmitted from the image data processing section 1026 to the printer 1022 by way of image data output section 1031.

The printer 1022 comprises components similar to that of the printer driver 1014 shown in FIG. 2 in addition to the above described output characteristics converting circuit 1028, the head drive circuit 1029 and the printing head 1030.

Thus, the printer 1022 comprises an image data input section 1032 for receiving image data from the digital still camera 1021, an RGB-CMY converting section 1033 connected to the image data input section 1032 to convert RGB image data into CMY printing data, a color correcting section 1034 for carrying out necessary color correcting operations, a black extracting/underlying color removing section 1035 (printing data for black are denoted by K in FIG. 4), an output gamma correcting/tone modifying section 10136 for correcting the characteristics specific to the printer and a sharpness modifying section 1037 adapted to process edges of the image.

Thus, the RGB image data input to the image data input section 1032 to the printer driver 1014 are firstly converted into CMY printing data and corrected for colors before they are converted into printing data containing data for black, which data are then corrected for the characteristics specific to the printer and processed for edges. The obtained corrected data are then transmitted to the output characteristics converting circuit 1028. Note that, if the printer 1022 is a binary printer such as an ink jet printer adapted to reproduce the image as a function of presence of absence of each of a predetermined number of printing dots, a binarizing section will have to be arranged downstream relative to the sharpness modifying section 1037. On the other hand, the use of such a binarizing section will not be necessary if the printer 1022 is of a type adapted to express the tone of the image by means of the printing dots such as a sublimation type printer.

Therefore, the CMYK printing data are transmitted sequentially to the head driver circuit 1029 and the printing head 1030 by way of the output characteristics converting circuit 1028 for printing an image.

However, the above described printing methods are accompanied by the following problems.

With the first method, various peripheral devices have to be arranged in place and connected to the computer and then device drivers adapted to the respective peripheral devices have to be incorporated into the computer. This is a very cumbersome operation. Additionally, application programs adapted to input, edit, process, correct and/or print images to the satisfaction of the user have to be installed into the computer. Then, the device drives have to be regulated in such a way that their respective application programs may properly control the respective peripheral devices to increase the cumbersomeness of operation. If one or more than one peripheral devices that cannot be controlled by the commercially available application programs are involved, additional application programs will have to be prepared for them. Then, the user will have to handle a number of application programs that have to be exchange image data. Thus, it will be appreciated that a tremendous degree of cumbersomeness will be involved in the above operation.

Additionally, if a desk-top type or tower-type computer is used, a large space will be require to connect it to the peripheral devices to give rise to a handling problem.

Furthermore, commercially available application programs are designed to operate multi-functionally in order to make them adaptable to marketed image input devices and printers that are normally designed to be as general purpose devices so that the user will have to give commands to select specific features of the programs probably. This sort of operation of selecting specific features of given programs normally is beyond the knowledge and skill of an ordinary user.

Conventionally, when displaying an image on a display device such as a CRT or a liquid crystal monitor and printing an image on a recording medium by means of a printer connected to a general purpose computer, the image data are corrected by the display device driver and the printer driver independently by taking the display characteristics and the printing characteristics into consideration respectively so that the reproduced image may be displayed and printed under optimal conditions.

However, with the above method of using a general purpose computer, it is generally not possible to specifically take the characteristics of the display device and those of the printer into consideration within the scope of the control ability of the operating system (OS) of the computer. This means that it is not possible to make the images displayed on the display screen of the display device and those printed by the printer have a uniform picture quality level regardless of the device and the printer connected to the general purpose computer and the quality of the image displayed on the display screen of the display device or printed by the printer is corrected optimally by the display device driver or the printer driver connected to the display device or the printer, which ever appropriate, according to the criteria of the driver. The net result can be that the picture quality of the image displayed on the display screen of the display device connected to the general purpose compression and that of the image printed by the printer connected to the general purpose computer do not necessarily agree with each other to a great disadvantage of the user.

Recently, color management systems have been developed. They have the objective of making image data input devices, display devices and printers to calorimetrically agree with each other. With such a system, the image data input through an input device are corrected in a manner specific to the device and the chromaticity coordinate system of the image data is converted to a standard one. Then, the image data expressed in terms of the standard chromaticity coordinates system are corrected in a manner specific to the display device that displays the image of the image data. Similarly, the image data are corrected in a manner specific to the printer that prints out the image of the image data. In this way, the related devices are made only to colorimetrically agree with each other under specific observing conditions (to be referred to as standard observing conditions).

Thus, with such a system, conditions other than the standard observing conditions are not taken into consideration. In other words, a system that is intended to have the related devices to calorimetrically agree with each other does not consider the remarkable aspect of the human nature that a person seeing same and identical images produced by different means of expression may have different impressions on them. This problem arises not only in terms of the image colors but also in terms of the sharpness of image and other aspects of image.

Thus, if the image data input to the different devices are corrected only in terms of the display output characteristics and the printing output characteristics independently to make them agree with each other calorimetrically, the person seeing the image produced by the display device and the image printed by the printer may normally have different impressions on them to produce a situation far from satisfying the observer.

With the above described second method, on the other hand, the achievement of operations of inputting, editing, processing, correcting and/or printing images exclusively relies on the functional features of the input device, which have only a limited capacity. Additionally, the performance of input device differs remarkably depending on the individual device and the operational procedures are often modified to a great disadvantage of the user. Additionally, it is currently not possible to use a film scanner for silver salts pictures as input device and technological developments are expected for printing copies of silver salt film pictures. Still additionally, the technological status quo is that an input device can be connected to a printer only to establish a one-to-one relationship and it is not possible to input image data concurrently through a plurality of input devices.

With the above described second method, the input device and the printer are functionally not related. In other words, the input device that is normally provided with an image display feature will be corrected in a manner suitable for its display output characteristics while the printer will be corrected in a way suited for its printing characteristics. As a result, the quality of the image displayed on the display device and the quality of the image printed by the printer do not necessary agree with each other.

In view of the above circumstances, it is therefore the object of the present invention to provide a printer that can be operated in a simple way without requiring a large space and with which difference in the color tone and the contrast between the image displayed on the display device and the image printed by the printer can be minimized to make the two images show visually a same quality.

SUMMARY OF THE INVENTION

According to the present invention, the above object and other objects of the invention are achieved by providing a printer comprising:

an image data input section adapted to convert the externally input digital image data and/or an analog image signal into first digital image data by analog/digital conversion;

an image printing correcting section for determining if each of the pixel data values found within a predetermined range of said first digital image data is found within a predetermined data range by means of a predetermined judging method and carrying out, whenever necessary, a predetermined processing operation for making each of the pixel data values found within the predetermined range of said first digital image data found within a predetermined range to produce second digital image data;

a printing output processing section for carrying out a printing output processing operation for converting said second digital image data into printing data for printing an image in an image printing section;

an image printing section for printing an image as output on a recording medium according to said printing data;

an image display output correcting section for determining if each of the pixel data values found within a predetermined range of said first digital image data is found within a predetermined data range by means of a predetermined judging method and carrying out, whenever necessary, a predetermined processing operation for making each of the pixel data values found within the predetermined range of said first digital image data found within a predetermined range to produce third digital image data; and an image display output section for displaying said third digital image data as output;

said image printing correcting section being adapted to determine if each of the pixel data values found within a predetermined range of said first digital image data input by way of the image data input section is found within a predetermined data range and, if it is determined that said pixel data values are not found within the predetermined range, carry out a predetermined processing operation for making each of the pixel data values found within the predetermined range of said first digital image data found within a predetermined range to produce second digital image data before sending them to the printing output processing section;

said image display output correcting section being adapted to determine if each of the pixel data values found within a predetermined range of said first digital image data input by way of the image data input section is found within a predetermined data range and, if it is determined that said pixel data values are not found within the predetermined range, carry out a predetermined processing operation for making each of the pixel data values found within the predetermined range of said first digital image data found within a predetermined range to produce third digital image data before sending them to the image display output section.

As described above, in a printer according to the present invention, the image printing correcting section determines if each of the pixel data values found within a predetermined range of said first digital image data is found within a predetermined data range by means of a predetermined judging method and, if it is determined that said pixel data values are not found within the predetermined range, carries out a predetermined processing operation for making each of the pixel data values found within the predetermined range of said first digital image data found within a predetermined range to produce second digital image data before sending them to the printing output processing section, which then converts said second digital image data into printing data so that the image printing section prints out an image as output on a recording medium according to said printing data.

On the other hand, the image display output correcting section determines if each of the pixel data values found within a predetermined range of said first digital image data is found within a predetermined data range by means of a predetermined judging method and, if it is determined that said pixel data values are not found within the predetermined range, carries out a predetermined processing operation for making each of the pixel data values found within the predetermined range of said first digital image data found within a predetermined range to produce third digital image data before sending them to the image display output section, which displays said third digital image data as output.

Thus, with a printer according to the invention, the image printed by said image printing section and the image displayed by the image display output section are made to visually show a same quality by appropriately selecting a judging method and a processing method for the image printing correcting section and also appropriately selecting a judging method and a processing method for the image display output section.

DETAILED DESCRIPTION OF THE INVENTION

Now, the present invention will be described by referring to the accompanying drawings that illustrate preferred embodiments of the invention.

Figure 1:
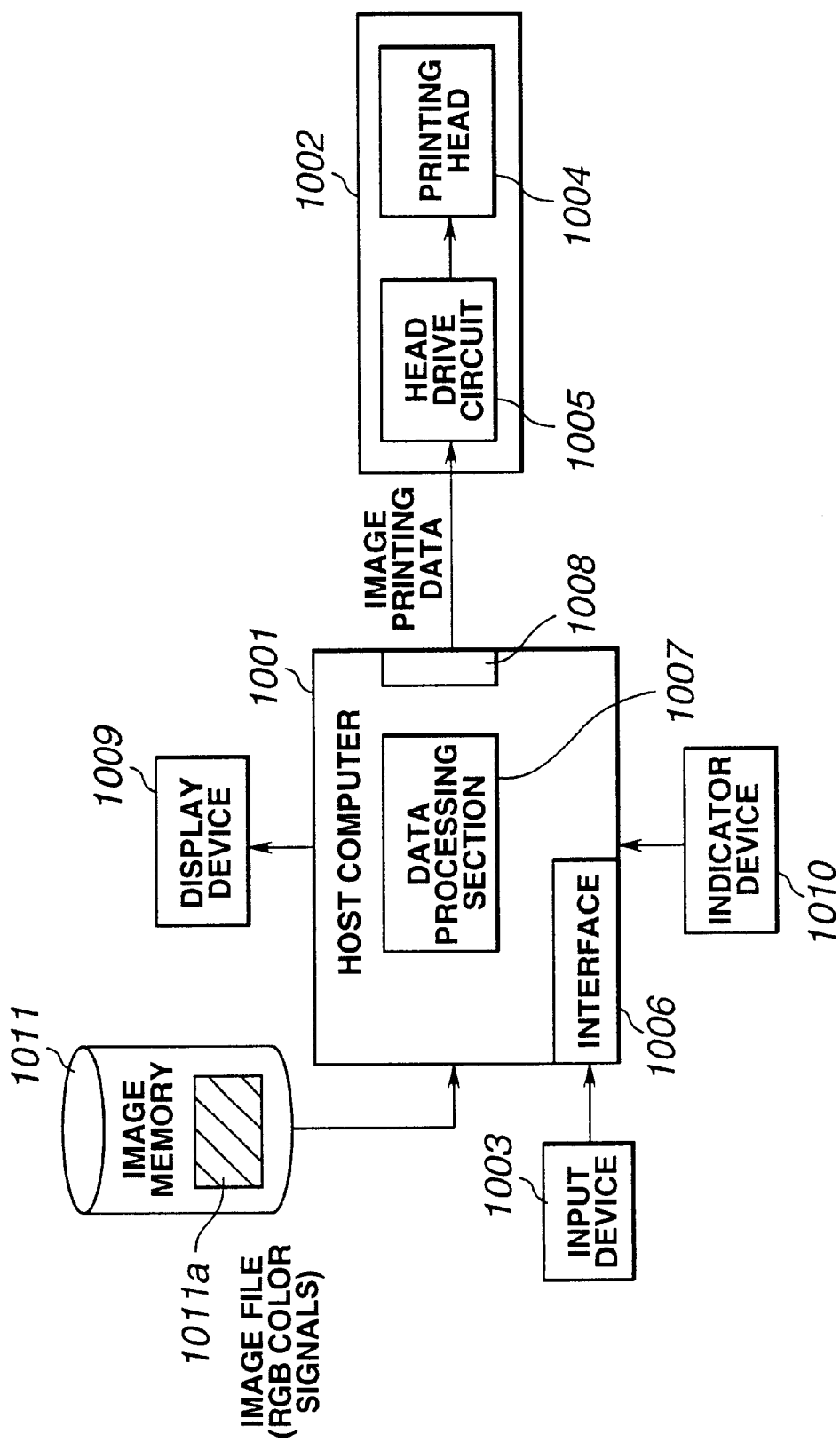
FIG. 1 is a schematic block diagram of a known printer illustrating a known image data printing method.
Figure 2:
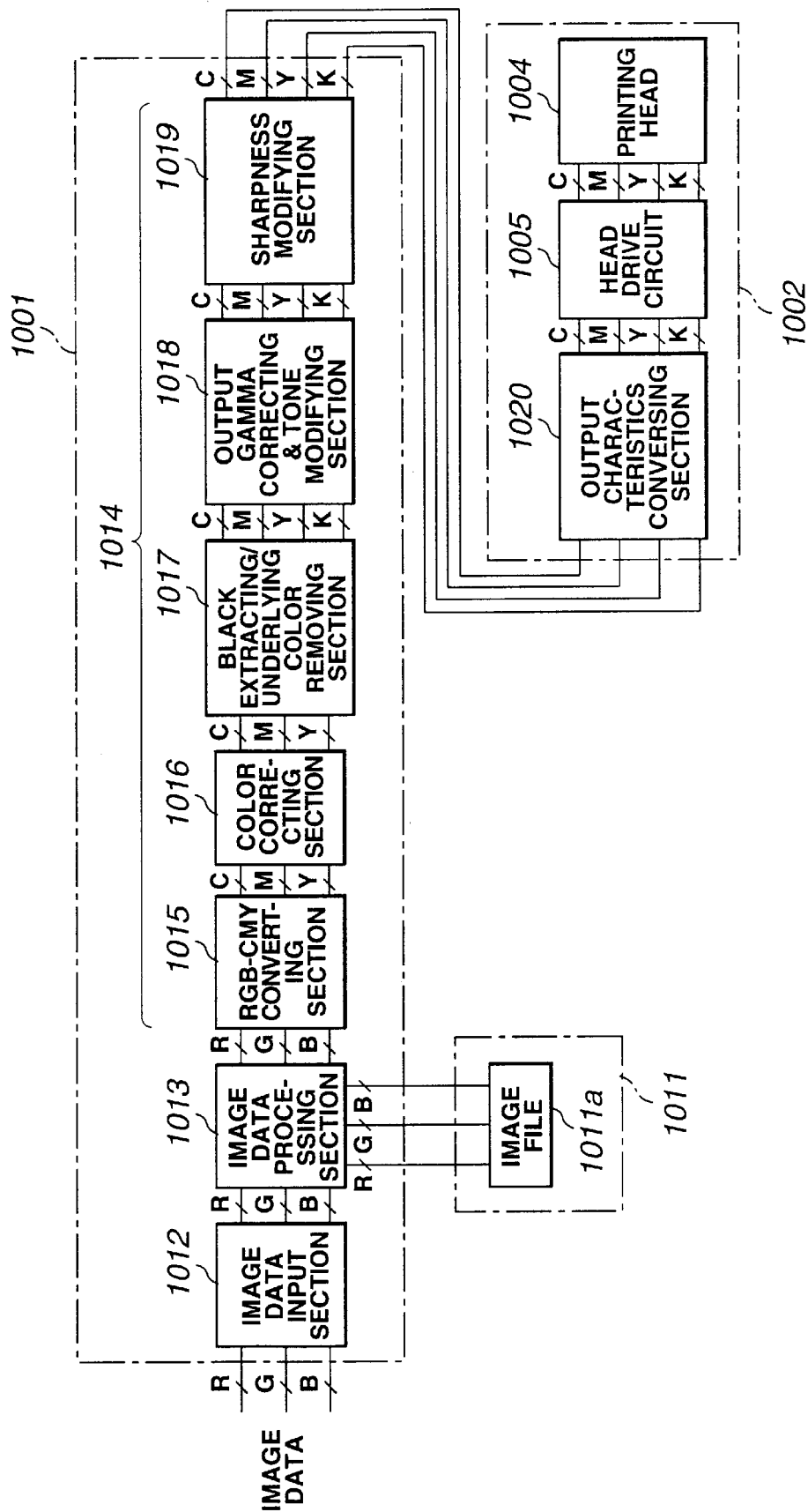
FIG. 2 is a schematic circuit diagram of the known printer of FIG. 1 illustrating the flow of data.
Figure 3:
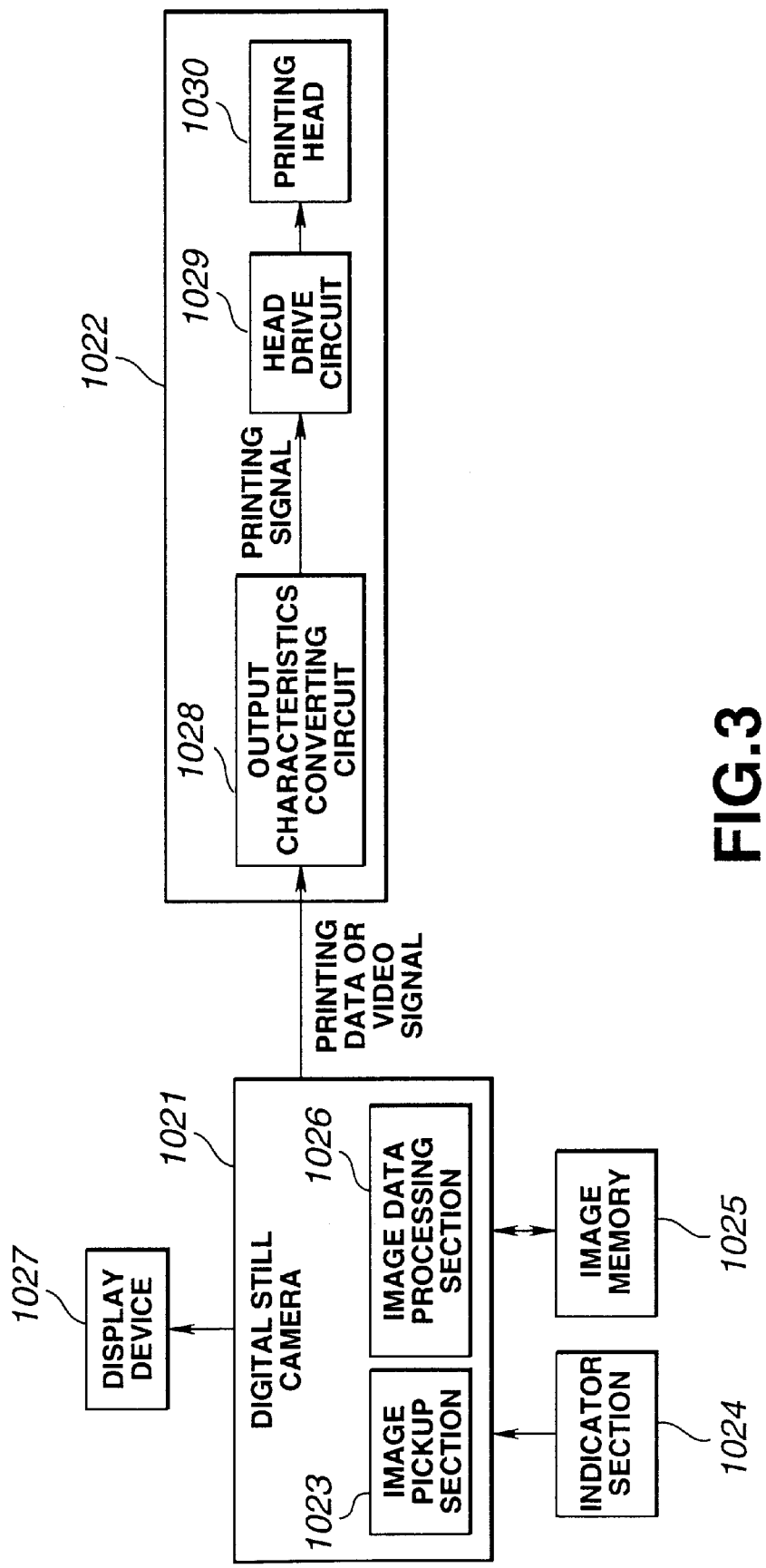
FIG. 3 is a a schematic block diagram of another known printer illustrating another known image printing method.
Figure 4:
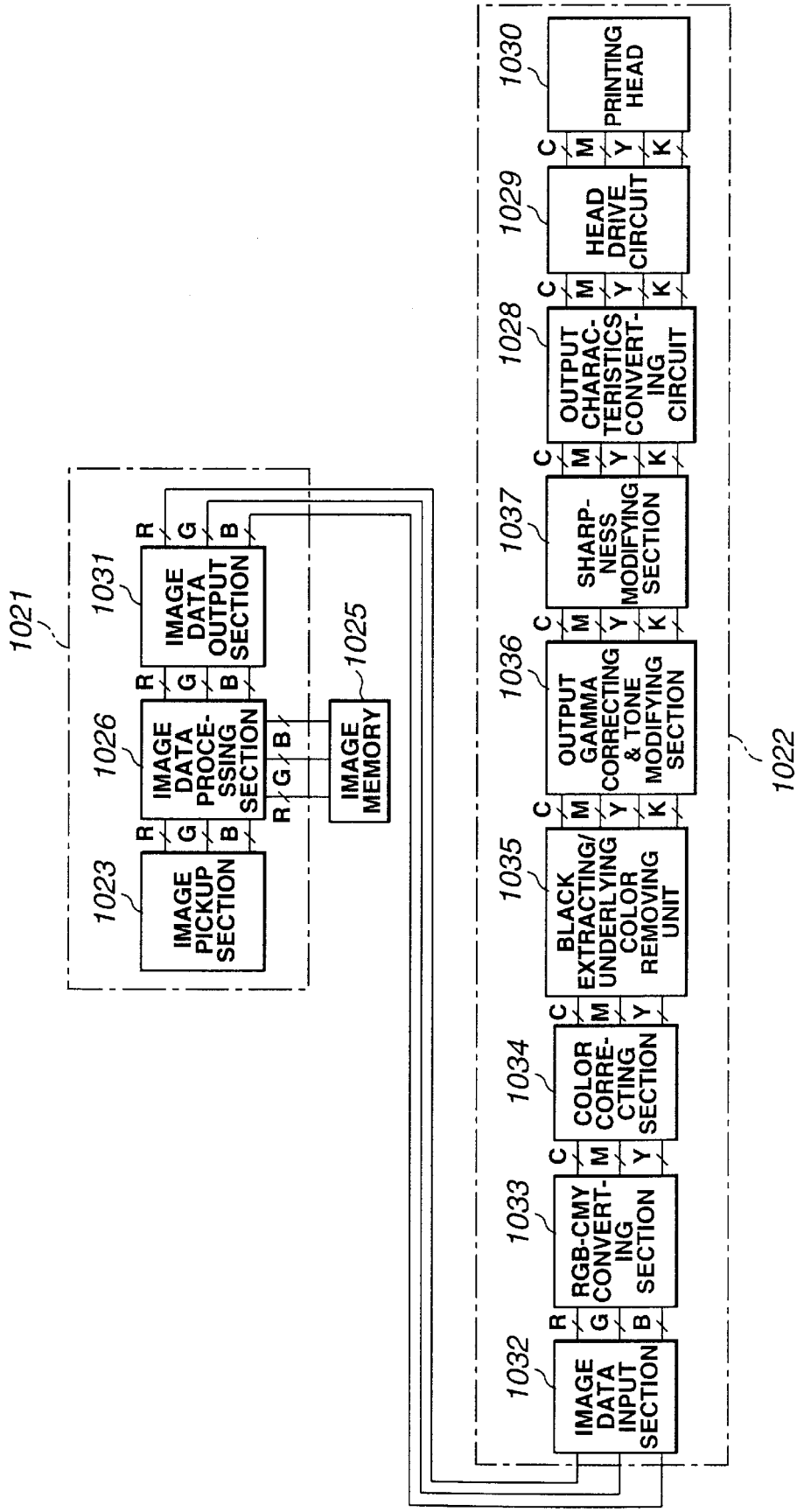
FIG. 4 is a schematic circuit diagram of the known printing of FIG. 3, illustrating the flow of data.
Figure 5:
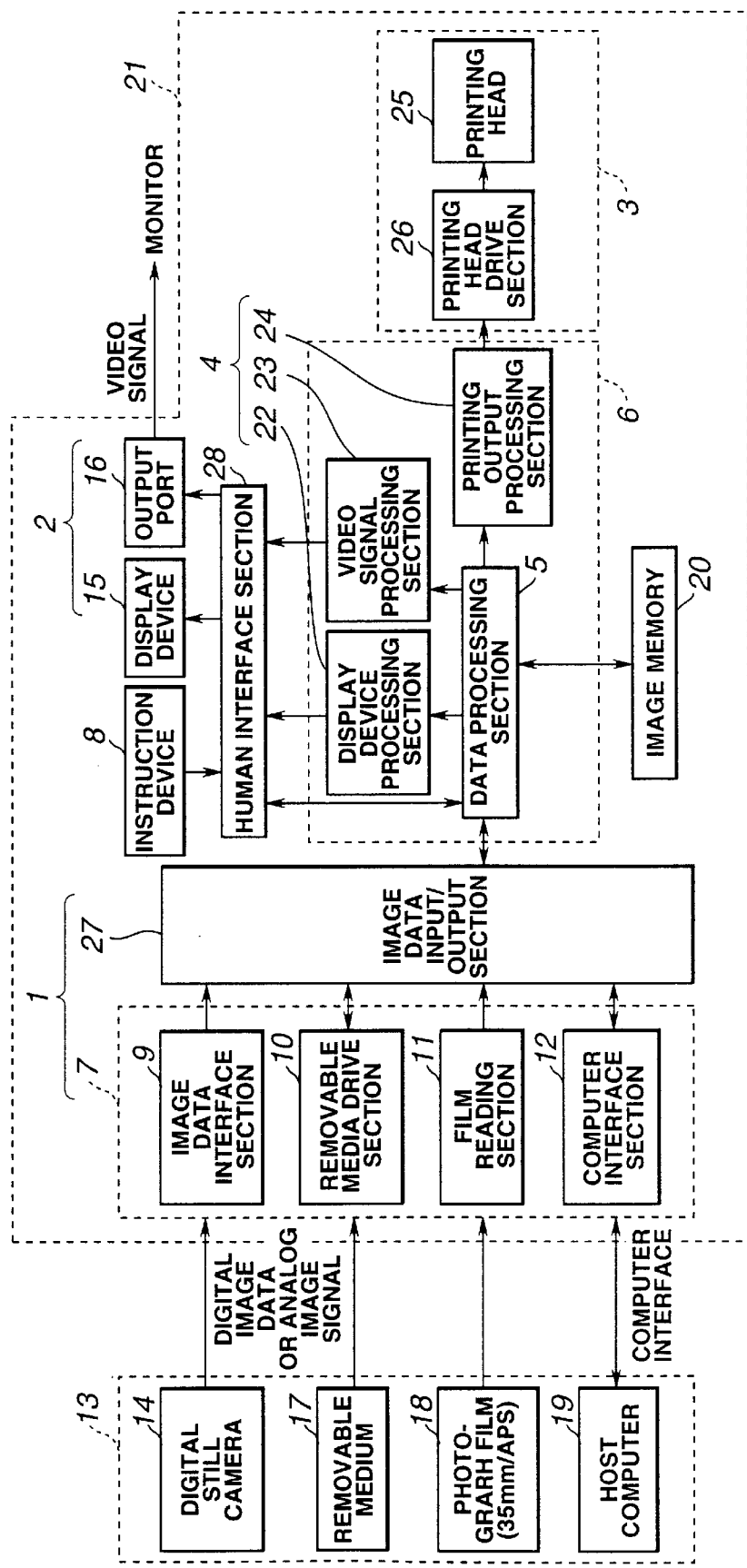
FIG. 5 is a schematic block diagram of a printer according to the invention.

FIG. 5 is a schematic block diagram of a printer according to the invention and comprising at least an image data input section 1 adapted to convert the externally input digital image data and/or an analog image signal into first digital image data by analog/digital conversion, an image display output section 2 for displaying said first digital image data as output, an image printing section 3 for printing said first digital image data on a recording medium and a characteristics correcting section 4 for determining if each of the pixel data values in the first digital image data has to be processed or not and processing it whenever necessary to define the quality of the image to be displayed on said image display output section 2 and also the quality of the image to be printed by said image printing section 3.

The printer also comprises an image processing section 6 including a data processing section 5 and adapted to edit, synthetically and/or non-synthetically process and correct said first digital image data to turn them into edited and processed first digital image data.

Said image data input section 1 of the printer includes therein an analog image signal input means for receiving analog image signals and an image input means 7 for receiving digital image data.

The printer additionally comprises a command device 8 for receiving external command.

Thus, with the above described printer, the image input means 7 of the image data input section 1 receives digital image data and/or an analog image signal converts them into first digital image data by way of analog/digital conversion, which ae then output to the image processing section 6. Then, whenever necessary, the data processing section 5 of the image processing section 6 edits, synthetically and/or non-synthetically process and/or correct the first digital image data to produce edited and processed first digital image data. Subsequently, the first digital image data and/or the edited and processed first digital image data are sent to the image display output section 2 and the image printing section 3 by way of the characteristics correcting section 4, which image display output section 2 and image printing section 3 respectively displays and print an image.

The characteristics correcting section 4 includes a display device processing section 22 and a video signal processing section 23 operating as image display output correcting section for defining the quality of the image displayed by the image display output section 2 in addition to a printing output processing section 24 operating as image printing correcting section for defining the quality of the image displayed by the image printing section 3.

Thus, with a printer according to the invention and having a configuration as described above, the printing output processing section 24 operating as image printing correcting section for the first digital image data and/or the edited and processed first digital image data input by way of the image data input section 1 determines if each of the pixel data values found within a predetermined range of said first digital image data is found within a predetermined data range by means of a predetermined judging method and, if it is determined that each of the image data values found within the predetermined range of said the first digital image data and/or the edited and processed first digital image data image data is not found within the predetermined data range, it carries out a predetermined processing operation for making each of the pixel data values found within the predetermined range of said first digital image data found within a predetermined range to produce second digital image data, which second digital image data are then converted into printing data by the printing output processing section 24 so that the image printing section 3 may print an image on a recording medium according to the printing data.

Additionally, with a printer according to the invention and having a configuration as described above, the display device processing section 22 and the video signal processing section 23 operating as image display output correcting section for the first digital image data and/or the edited and processed first digital image data input by way of the image data input section 1 determines if each of the pixel data values found within a predetermined range of said first digital image data is found within a predetermined data range by means of a predetermined judging method and, if it is determined that each of the image data values found within the predetermined range of said the first digital image data and/or the edited and processed first digital image data image data is not found within the predetermined data range, it carries out a predetermined processing operation for making each of the pixel data values found within the predetermined range of said first digital image data found within a predetermined range to produce third digital image data, which third digital image data are then converted into printing data by the display device processing section 22 and the video signal processing section 23 so that the image display output section 2 may display an image.

Thus, with a printer according to the invention, the image printed by said image printing section 3 and the image displayed by the image display output section 2 are made to visually show a same quality by appropriately selecting a judging method and a processing method for the printing output processing section 24 operating as image printing correcting section and also appropriately selecting a judging method and a processing method for the display device processing section 23 and the video signal processing section 23 operating as image display output section.

Note that, in the above described printer of the present invention, the range of the entire the first digital image data or a predetermined range of the pixel data values of the first digital image data preferably represents the predetermined range of the first digital image data to be used for the judgment of the printing output processing section 24 operating as image printing correcting section and that of the display device processing section 23 and the video signal processing section 23 operating as image display output section.

Preferably, in the above described printer of the present invention, the predetermined range of the first digital image data is determined by the contents of the first image digital data.

With such an arrangement, the quality of the image printed by the image printing section 3 and that of the image displayed by the image display output section 2 can be made visually equal and optimal.

Then, the predetermined range of the first digital image data may be used to represent a specific image pattern determined by the contents of the first image digital data so that only the portion of the first image data that agrees with the specific image pattern and is consisted of the pixel data values within the predetermined data range may be processed.

With a printer according to the invention, the judging method for determining if each of the pixel data values found within a predetermined range of said first digital image data is found within a predetermined data range by means of a predetermined judging method and the processing method for making each of the pixel data values found within the predetermined range of said first digital image data found within a predetermined range may be different between the printing output processing section 24 operating as image printing correcting section and the display device processing section 23 and the video signal processing section 23 operating as image display output section.

With a printer according to the invention, the saturation level of the pixel data values of the second digital image data produced by the printing output processing section 24 operating as image printing correcting section is preferably higher than the saturation level of the pixel data values of the third digital image data produced by the display device processing section 23 and the video signal processing section 23 operating as image display output section.

With a printer according to the invention, the judging method for determining if each of the pixel data values found within a predetermined range of said first digital image data is found within a predetermined data range by means of a predetermined judging method and the processing method for making each of the pixel data values found within the predetermined range of said first digital image data found within a predetermined range of the printing output processing section 24 operating as image printing correcting section and those of the display device processing section 23 and the video signal processing section 23 operating as image display output section are preferably variable.

If such is the case, the judging methods are preferably selected from a plurality of different judging method and the processing methods are preferably selected from a plurality of different processing method. Preferably, said judging methods are made variable by selecting variable parameters and said processing methods are made variable also by selecting variable parameters.

If such is the case, a printer according to the invention is preferably operable in a plurality of different operation modes so that the judging methods and the processing methods may be selected or rewritten according to the selected operation mode.

Now, each of the components of a printer according to the invention will be discussed in detail.

The image input means 7 of a printer according to the invention includes an image data interface section 9 operating as analog image signal input port or a digital image data input port, a removable medium drive section 10 that is a disk drive or a memory drive, a film reading section 11 that is a scanner having a photoelectric conversion element and a computer interface section 12 operating as digital image data input port.

The image data interface section 9 is used to connect a digital still camera 14 shown as externally connected device 13 in FIG. 5, a digital video camera, an original reading scanner and/or other devices for picking up an image of an object and the image data input/output section 27.

Note that the above image data interface section 9 operates not only as a physical connector but also as a digitized image data input port adapted to control the externally connected devices 13. The connection of the externally connected devices 13 may be realized by means of a wire or by wireless means such as infrared rays and/or electromagnetic waves.

The image data interface section 9 may be so arranged as to receive analog signals such as NTSC video signals, PAL video signals, RGB video signals and/or S terminal video signals (and hence operate as analog image signal input port) and digitize them to produce image data.

When receiving a moving picture taken by a digital video camera or picked up in the form of an analog video signal, the moving picture may be output to an external monitor connected to the display device 15 or the output port 16 of the image display output section 2 so that the moving picture selected by the image data interface section 9 according to the command issued by the user by means of the command device 8 under the control of human interface section 28, which will be described hereinafter, may produce image data for a digitized still scene contained in the moving picture.

The picked up image data are then sent to the data processing section 5 by way of the image data input/output section 27 either sequentially and continuously or on a block by block basis, each block containing a given volume of data. Alternatively, the image data may be sent as a unit of data for an entire still picture.

The removable medium drive section 10 is adapted to write image data by driving a removable medium 17 that is shown also as an externally connected device 13 in FIG. 5.

The removable medium 17 may be a magnetic card, a magnetic disk, an optical disk, a magneto-optical disk or an IC memory card comprising a flush memory, a ROM or a RAM.

The removable media drive section 10 is designed to drive and control the mechanism thereof if the removable medium requires driving the physical mechanism for its operation.

The image data taken in the above described manner are then transmitted to the data processing section 5 by way of the image data input/output section 27. As noted above, the image data may be sent either sequentially and continuously or on a block by block basis, each block containing a given volume of data. Alternatively, the image data may be sent as a unit of data for an entire still picture.

If the recording medium contains more than one set of image data, they may be output to monitor connected to the display device 15 or the output port 16 of the image display output section 2 sequentially or in a compressed state so that the removable medium drive section 10 may transmit the image data for the moving picture selected by the image data interface section 9 according to the command issued by the user by means of the command device 8 under the control of human interface section 28, which will be described hereinafter, to the image data input/output section 27 to make the data processing section 5 carry out a predetermined processing operation on the image data. Contrary, the image data subjected to a predetermined processing operation of the data processing section 5 may be transmitted to the removable medium drive section 10 by way of the image data input/output section 27 so that the removable medium drive section 10 may write and store the transmitted image data on the removable medium 17.

The film reading section 11 is adapted to read an image on photograph film 18 illustrated as an externally connected devices 13 in FIG. 5, which may be an ordinary 35 mm film, an APS (advanced photo system) film containing magnetic information on the image, a large roll type film or a sheet type film, and transform it into image data.

More specifically, the film reading section 11 comprises a photoelectric converter such as a CCD line sensor, a photo diode, a photo transistor, a CCD image sensor or a C-MOS image sensor, a photoelectric converter drive section for driving and controlling the photoelectric converter and a drive control section for driving and controlling the film in such a way that the desired image shows a proper correspondence to the photoelectric converter.

The picked up image data are then transmitted to the data processing section 5 by way of the image data input/output section 27. As noted above, the image data may be sent either sequentially and continuously or on a block by block basis, each block containing a given volume of data. Alternatively, the image data may be sent as a unit of data for an entire still picture.

If a plurality of images are recorded on the film, they may be output as they are, in a compressed state or as images obtained by coarsely reading the original images to the monitor connected to the display device 15 or the output port 16 of the image display output section 2 so that the film reading section 11 may transmit the image data selected according to the command issued by the user by means of the command device 8 under the control of human interface section 28, which will be described hereinafter, to the image data input/output section 27 to make the data processing section 5 carry. out a predetermined processing operation on the image data. If the imaged obtained by coarsely reading the original images are used, the selected image will be read normally for the above operation.

If the film is tilted relative to the readable range of the photoelectric converter or the composition of an image in the film is not appropriate as the image is read by the film reading section 11, it is possible to automatically modify the position of the film or the reading position of the photoelectric converter under the control of the human interface section 28 so that the film or the image may be read once again.

The film reading section 11 may be made to have a function of correcting the characteristics of the photoelectric converter and those of the lighting system that is used for the photoelectric conversion. However, if the processing operation to be conducted for the correction can be realized as digital processing operation, it may be carried out not by the film reading section 11 but by the data processing section 5.

If the photograph film 18 is an APS film and read by a photoelectric converter, the film reading section 11 may additionally comprise a magnetic head so that the magnetic data recorded on the APS film and relating to the image shooting may be read during the operation of reading the film. The magnetic data are displayed on the image display output section 2 as image shooting data relating to the image data under the control of the human interface section 28 and used by the data processing section 5 when processing the image data so that they may be stored with the image data.

When printing an image selected from a photograph film 18, a system centered around a general purpose computer is conventionally used. However, with a printer according to the invention, it is no longer necessary to use a general purpose computer so that the image can be printed in a simple way.

The computer interface section 12 is an interface for connecting the host computer 19 that is shown as an externally connected devices 13 in FIG. 5 and the image data input/output section 27. A high speed interface such as a bi-concentronics, an IEEE-1394, a USB or an SCSI is typically used for it. The computer interface section 12 controls the interfaces and also the protocols involving commands and responses for bidirectionally transmitting and receiving image data by means of the interfaces. The image data to be transmitted and received may typically be handled on a line by line basis, a block by block basis or an area by area basis.

Conventionally, when a computer-generated image is printed out by means of a printer, various processing operations have to be carried out by the printer driver of the computer for printing out the image. On the other hand, with a printer according to the invention, those processing operations are carried out by the data processing section 5 and the characteristics correcting section 4 to dramatically reduce the amount of the processing operations carried out by the printer driver of the host computer 19. This means that the time required for the host computer 19 to carry out the above processing operations and the host computer 19 can be used for other operations so that the overall time period during which the CPU of the host computer 19 is occupied can be significantly reduced.

With the above described printer, the data obtained as a result of the various processing operations carried out by the data processing section 5 on the image data input through the image input means 7 are sent to the host computer 19 so that the latter may perform various processing operations on the data by means of other computer programs and store the outcome in it.

While four different image input means 7 are described above, it will be understood as a matter of course that the present invention is by no means limited thereto and various other image input means 7 may be used for a printer according to the invention without departing from the scope of the invention.

The image data input/output section 27 controls the operation of transferring image data from the image input means 7 to the data processing section 5 of the image processing section 6. More specifically, it controls the operation of transferring the first digital image data obtained through analog/digital conversion of the digital image data and/or the analog image signal externally input by way of the image input means 7 to the data processing section 5.

The image data input/output section 27 also has the function of regulating the timing of transferring image data from the originating section to the terminating section and preventing collisions of image data. Additionally, it may have the function of modifying the image data input through various different so that they may be handled uniformly.

The image data input/output section 27 is so adapted as to receive image data from the image data interface section 9 and the film reading section 11 of the image input means 7 and transmit image data to and receive image data from the removable medium drive section 10 and the computer interface section 12. Thus, the image data input/output section 27 operates as data input/output section. The operation of controlling the timing of transmitting and receiving image data and the selection of image data of the image data input section 1 is conducted according to a command from the human interface section 28, which will be described hereinafter, if the use issues a command and controlled by the data processing section 5 if the operation is automatically performed.

In a printer according to the invention, the image display output section 2 comprises a display device 15 and an output port 16 that operates as an analog image signal output port and/or a digital image data output port. The output port 16 is connected to an externally connected monitor.

This display device 15 principally comprises a full color display unit for displaying image data and data on the human interface section 28, which will be described hereinafter, and a drive section for driving the display unit. The display device 15 is preferably a flat panel display device such as a liquid crystal panel. It may additionally comprises one or more than one state display units, each comprising an LED.

The command device 8 for externally receiving commands may include any of a mouse, a track ball, a key board, a touch panel arranged on the display device 15 and a pen touch input panel using a pen tip for entering data alone or in combination. It is used for the user to enter commands as a function of the control operation of the human interface section 28, which will be described hereinafter. If a touch panel or a pen touch input panel is used and arranged on the display device 15, the display area of the operating keys on the display device and the display area of the keys displayed on the touch panel or the pen touch input panel will be identical or closely related to each other when they are used for input operations.

If the keys can give rise to a chattering phenomenon, a chattering elimination measure will be taken to prevent erroneous actions from taking place by installing an electric circuit and/or a control program. As for the use of the command device 8, it may be so arranged that the user can input a command in a command input area defined on the external monitor display screen under the control of the human interface section 28 by moving the pointer of the command device 8 in the area as the latter is displayed also on the external monitor display screen for displaying the video signal output from the output port 16.

The human interface section 28 is provided with a number of functions including the function of outputting the image data sent from the image processing section 6 to the display device 15 and the output port 16 of the image display output section 2, that of selecting an image and reading image data according to the command input by the user through the command device 8, that of selecting various parameters for the operation of editing, synthetically or non-synthetically processing and/or correcting image data by means of the data processing section 5 of the image processing section 6, that of selecting a judging method and a processing method for defining the quality of the image to be displayed by the image display output section 2 and also selecting a judging method and a processing method for defining the quality of the image to be printed by the image printing section 2 by means of the characteristics correcting section 4 and that of controlling the printer according to a printing output command and a command issued by the user.

The human interface section 28 synthetically combines the image data for the dip device 15 and the output port 16 of the image display output section 2 that have been processed by the image processing section 6 with the data for displaying the keys, the slide volume and the menu necessary for the operation of the user and outputs the obtained data to the display device 15 and also to the external monitor by way of the output port 16.

With the above described arrangement, it is therefore possible to make the display device 15 and the external monitor display differently. For example, it may be so arranged that the display device 15 displays image data and the image synthetically produced by the human interface section 28, while the output port 16 receives an image signal to make the external monitor display only image data. Thus, for example, the display device 15 may display all the images recorded on the recording medium whereas the external monitor may display only selected image data.

The data to be output to the display device 15 and those to be output to the output port 16 and the commands necessary for the data are determined by the status of operation of the printer and the processing operation of the image processing section 6.

As pointed out above, the image processing section 6 principally comprises the data processing section 5 and the characteristics correcting section 4.

If the image data input through the image data input section 1 do not show ideal quality characteristics, the image processing section 6 corrects the input image data by means of the data processing section 5 in order to improve the quality of the image to be display on the display device 15 and/or the external monitor and that of the image to be printed by the image printing section 3.

The data processing section 5 received the command of the user input through the command device 8 by way of the human interface section 28 and carries out a predetermined operation of editing, synthetically or non-synthetically processing, correcting and/or transforming the first digital image data from the image data input section 1 to produce edited first digital image data.

The data processing section 5 is designed to control the access to the image memory 20 so that image data may be written to or read from the memory under the control of the data processing section 5 whenever necessary. The image data stored in the memory are those that have been edited, synthetically or non-synthetically processed and/or corrected by the data processing section 5 of the image processing section 6. If information relating to the image data is available, it will also be stored.

The image memory 20 may store compressed data, expandably compressed data and non-expandably compressed data. The type of data to be stored is determined depending on various factors including if it is easy to handle in the image processing section 6, if it is permissible to repeat compression/restoration at the cost of degradation of image quality, the number of sets of image data stored in the image memory 20, the maximum capacity of the image memory 20, and the rate of reading data from and writing data into the image memory 20. From the viewpoint of data processing rate, possible degradation of image quality and data handling, data are preferably stored in the image memory 20 without being compressed. Furthermore, the image memory 20 preferably has a memory capacity that can store a plurality of sets of uncompressed image data. Note that the image memory 20 may be partly used as working memory for image data to be used in the course of the processing operation conducted by the image processing section 6.

If the image memory 20 is to be accessed for compressed image data, the data processing section 5 should be adapted to compress image data before storing them in the image memory 20. As a matter of course, the compressed data that are read out from the image memory 20 should be expanded by the data processing section 5.

The data processing section 5 controls the access to the image memory 20 in such a way that it provides a time division access when an operation of writing image data to the image memory 20 and that of reading image data from the image memory 20 take place concurrently. Alternatively, the data processing section 5 may delay either of the above operations. If the memory capacity of the image memory 20 is variable, the addressing control for the image memory 20 can be realized properly by detecting the effective capacity of the image memory 20.

The data processing section 5 may be so arranged as to carry out digital processing operations when the image data interface section 9 and the film reading section 11 do not perform correcting operations characteristic to the respective input sections when picking up or reading respective image data.

The data processing section 5 digitizes image data before handling them. If the image data that are read out from the image data input section 1 and digitized are processed, keeping the number of bits of each data to be subjected to arithmetic operations same as that of each of the input image data, the accuracy of arithmetic operations will be degraded gradually. To avoid this, the number of bits of each data to be arithmetic operations has to be increased by 2 to 4 bits to minimize the degradation of accuracy in the course of the arithmetic operations so that the quality of the printed image may be secured.

When the user wants to edit, synthetically or non-synthetically process and/or correct the first digital image data input through the image data input section 1, the type each operation to be carried out is output to and displayed on the image display section 2 under the control of the human interface section 28 according to the command from the command device 8 so that the user may visually confirm the type of operation.

Once the user carries out desired operations on the first digital data to produce edited and processed first digital data and he or she issues a command for printing, the edited and processed first digital image data are sent to the image printing section 3 by way of the printing output processing section 24, which will be discussed in greater detail hereinafter.

It may be so arranged that the parameters and the computer programs to be used respectively by the removable medium drive section 20 and the computer interface section 12 in a later stage can be added or updated for the operation of editing, synthetically or non-synthetically processing and/or correcting image data carried out by the data processing section 5 of the image processing section 6. With such an arrangement, the printer can be provided with additional functional features.

The image data edited, synthetically or non-synthetically processed, corrected and/or transformed in the image processing section 6 may be written and stored in the removable medium 17 by means of the removable medium drive section 10. Additionally, the image processing computer programs and the computer programs for handling images installed in the host computer 19 that is connected externally by way of the computer interface section 12 can be utilized in may various ways when image data are transmitted to the host computer 19.

As pointed out above, the image processing section 6 comprises a data processing section 5 and a characteristics correcting section 4, which includes a display device processing section 22, a video signal processing section 23 and a printing output processing section 24.

The display device processing section 22 performs correcting operations suited to the characteristics of the display device 15 in order to display the first digital image data, which may or may not have been edited and processed depending on the requirements to be met, on the display device 15 by way of the human interface section 28.

The video signal processing section 23 performs correcting operations suited to the characteristics of the externally connected display device such as an external monitor and those of a standard video signal to be output to the display device in order to display the first digital image data, which may or may not have been edited and processed depending on the requirements to be met, on the display device.

Note that the image data output from the display device processing section 22 and the video signal processing section 23 to the human interface section 28 may be synthetically combined with other data by the human interface section 28 and the synthetically combined data may be displayed on the display device 15 and/or the external monitor. If such is the case, an illustration and/or characters requesting a command from the user and the pattern generated by the data processing section 5 may often be combined with the image data.

The printing output processing section 24 operates for transforming and/or correcting data as required for the printing operation of the image printing section 3 and transmitting the obtained data to the image printing section 3. The first digital image data that may or may not have been edited and processed depending on the requirements to be met normally contain data more than 8 bits for each of the RGB colors. On the other hand, the inks or toners used by the printing head 25 of the image printing section 3 are those of either the three colors of CMY or the four colors of CMYK. Therefore, the printing output processing section 24 is required to convert the RGB signals into signals of these colors and carry out transforming and correcting operations that are made necessary due to the environmental conditions of the printing operation such as correcting color breakups, if any, of the printed image attributable to a non-ideal state of the spectral sensitivity characteristics of the recording ink or toner of each of the colors, the color developing characteristics of the printing head 25, the inks or toners and the recording medium.

The printing output processing section 24 outputs the image data to be transferred to the printing head 25 after rearranging them to make them conform to the actual printing sequence of the printing head 25. Therefore, the printing output processing section 24 may comprise a RAM for temporally buffering printing data. Alternatively, when the data processing section 5 reads out image data from the image memory 20, the data reading addresses may be so controlled as to conform to the printing sequence of the printing head 25.

As pointed out above, a printer according to the invention is characterized in that the image display output section 2 and the image printing section 3 produces respective images that are visually of a same quality.

To do this, the printing output processing section 24 determines each of the pixel data values of the first digital image data and/or those of the first digital image data that have been edited and processed in order to define the quality of the image to be printed by the image printing section 3 and produce second digital image data. Additionally, the display device processing section 22 and/or the video signal processing section 23 determines each of the pixel data values of the first image data and/or the first image data that have been edited and processed in order to define the quality of the image to be displayed by the image display output section 2 and produce third digital image data.

Preferably, in the above printer, the above described correcting operation of the printing output processing section 24, the display device processing section 22 and/or the video signal processing section 23 of the characteristics correcting section 4 for generating second and third digital image data is such that it reproduces colors that are agreeable to average observers.

Preferably, in the above printer, the above described correcting operation of the printing output processing section 24, the display device processing section 22 and/or the video signal processing section 23 of the characteristics correcting section 4 for generating second and third digital image data is such that it reflects average memory colors in terms of specific contents of the image data.

Preferably, the above correcting operation is based on the viewing conditions of a viewer observing the image output from the image display output section 2 and the image printed from the image printing section 3 including those of the light source, assuming that it is an average light source.

In the correcting operation, one or more than one specific patterns may be extracted from the image data and the extracted patterns may be corrected. Alternatively, only one or more than one specific ranges of the image data may be corrected.

As pointed out above, in the above printer, the image display output section 2 and the image printing section 3 carry out a correcting operation to produce respective images that are visually of a same quality. However, it may be difficult to make the image quality quite satisfactory to the viewer. While image quality has various characteristic aspects, this is particularly true of color reproduction that is defined by lightness, hue and saturation. This problem will be discussed in detail below (see reference document 1: Bartleson, C. J. and Bray, C. P.: "On the Preferred Reproduction of Flesh, Blue-Sky and Green-Grass Colors", Photogr. Sci, Eng. 6, 1 (1962), reference document 2: "Imaging Part. 1, the Physical Aspect and the Subjective Aspect of Image Evaluation", Shashin Kogyo Shuppan, Jan. 20, 1988).

To simplify the discussion, assume here that an object is shot by some input means and a set of image data having a calorimetric value equal to that of the object at the time of shooting can be obtained by carrying out an appropriate correcting operation for the input characteristics of the input means.

When displaying the image data on the display device 15 of the printing display output section 2 and printing them on a recording medium by means of the image printing section 3, the viewer will find the obtained image of the object quite different from the object and of a poor image quality in terms of color even if the image data are displayed and printed as they are or after correcting them as a function of the output characteristics. This problem arises even if the view does not know the object nor see the object at the time of the shooting. This is because desired (preferred) colors of a specific image differ from the colors the object has when it is shot depending on the memory colors and the color preferene of the viewer.

In the following description, the colors that the viewer normally imagines for a familiar object will be referred to as memory colors and those that the viewer wants to be reproduced for the object will be referred to as preferred reproduction colors for the sake of convenience.

Thus, memory colors refer to the colors that the view normally imagines for a familiar object. In the case of an average memory color, the hue tends to shift in the direction of the most impressive color attributes for the viewer and both the saturation and the lightness increase in that direction. Preferred reproduction colors refer to the colors that the viewer wants to be reproduced for the object and will be defined in terms of various factors of image and various factors of the viewer including his or her preference and the type of the light source that is used for viewing an image of the object.

Thus, for the purpose of the invention, the object is something that is familiar to the view or so something that particularly attracts his or her attention. In terms of colors, generally the flesh color, the green grass color and the blue sky color will be involved. The above described tendency is particularly remarkable with the flesh color. Factors that can produce a preferred flesh color include the following.

1) Image-related factors sex, age and other individual factors of the object state of the background scene percentage ratio of the area occupied by the object the light source used when shooting the object 2) Viewer-related factors preference of the viewer (that may vary depending on the age of the viewer)

the light source used when viewing the image the distance separating the image and the viewer Preferred color reproduction of the flesh color on a chromaticity coordinate system is characterized by the following.

shift toward the white point reduction of allowance in the rotary direction of hue rise of allowance in the rising direction of saturation It has been known that the type of the light source used for viewing the image is not very influential. Generally speaking, in the case of photographs, preferred reproduction colors do not agree with memory colors.

Figure 6:
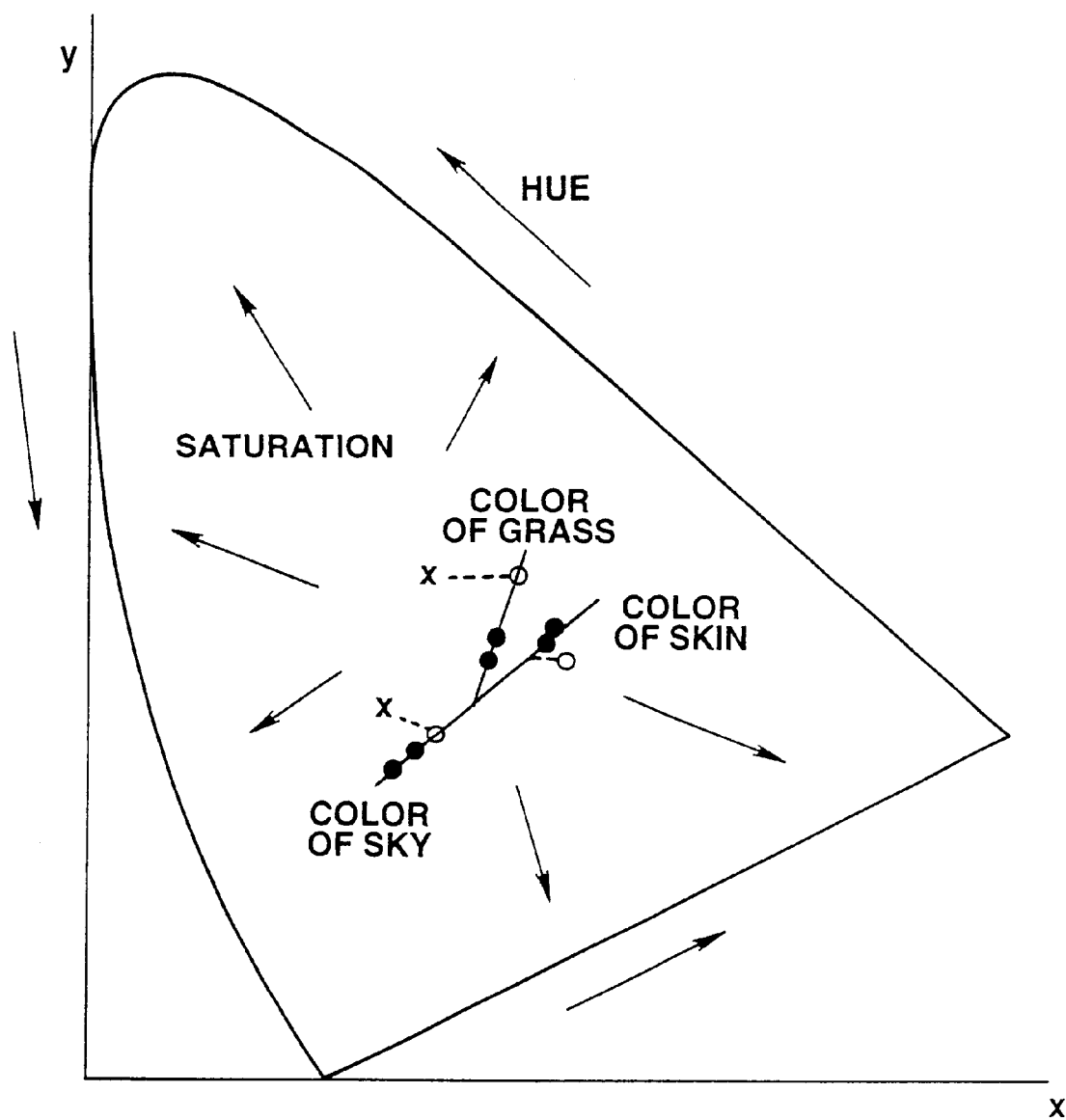
FIG. 6 is a graph showing a preferred color reproduction example on a CIExy chromaticity coordinate system.

FIG. 6 illustrates desirable color reproduction on a CIExy chromaticity coordinate system cited from the reference document 1. FIG. 6 particularly illustrates the relationship of the colors of objects indicated by ○, average memory colors indicated by X and preferred reproduction colors indicated by ● particularly in terms of flesh color, blue sky color and green grass color. Differently stated, FIG. 6 shows show hue and saturation change. More specifically, hue rotates along the edges of the graph and saturation rises toward the periphery from the center. It will be seen from FIG. 6 that preferred reproduction colors and average memory colors tend to shift from the colors of the object depending on the type of the object.

Apart from color reproduction, there are preferred reproduction techniques for sharpness, for instance. Generally speaking, it is not necessarily true that a high sharpness is always preferred. Different levels of sharpness will be preferred for portraits and graphic images. Therefore, a desirable level of sharpness will have to be selected for a particular image in order to make the image very impressive.

As discussed above, if the input image data are corrected as a function of the display output characteristics and the printing characteristics of the printer before displaying an image on the image display output section and printing an image by the image printing section, the produced images do not necessarily satisfy the viewer particularly in terms of the quality thereof.

Therefore, for the printer, it is desirable to carry out a correcting operation that is suited not only for characteristic aspects of displaying, outputting and printing an image but also for those of the output means of the printer and the image data.

Thus, in the printer, the printing output processing section 24 determines if each of the pixel data values of the first digital image data and/or those of the first digital image data that have been edited is found within a predetermined data range or not and, if it is found the pixel data value is not found within the predetermined data range, it carries out the above described predetermined processing operation to make the pixel data value found within the predetermined data range to produce second digital image data.

More specifically, it may transform the entire image data or selectively only those pixel data values that are found to be within the predetermined specific data range. Alternatively, it may extract a pattern from the image data and, if the pattern agrees with a predetermined specific pattern, it may selectively transform the data values within the pattern.

The above correcting operation may be conducted by a preselected method. It is effective for improving the quality of the printed image to carry out a predetermined correcting/transforming operation in terms of preferable reproduction colors and average memory colors on the image data of a specific range or area as described above.

The above predetermined operation is preferably an operation of transforming the first digital image data and/or the first digital image data that have been edited into those representing the image quality wanted by the viewer.

The above predetermined range may refer to the entire image data, part of the image data where the pixel data values are found within a specific data range or part of the image data selected on the basis of the image itself.

Examples of the operation of determining each of the pixel data values within a predetermined range and transforming it will be discussed below.

1) All the pixel data values of the input image data are selected and, if necessary, transformed.
2) Each of the pixel data values of the input image data is determined to be found within or out of a specific data range and only the values found within the data range are selected and transformed. For instance, when correcting the flesh color and if some of the pixel data values are found within a predetermined range of flesh color, the portion containing only those pixel data values will be transformed.
3) A pattern is extracted from the input image data and, if it is determined that the pattern agrees with a predetermined specific pattern, the pixel data values within the pattern are transformed. For instance, when correcting the flesh color, a specific target area of the image data (which may be the profile of the face or one of the arms of a person showing flesh color) is extracted as pattern and, if the pattern agrees with a predetermined specific pattern, the pixel data values within the pattern are transformed.
4) Above 2) and 3) are combined. For instance, an image pattern is extracted and checked if it agrees with a predetermined specific pattern. Then, only if it is found that the two patterns agree with each other and the pixel data values in the image pattern are found within a predetermined range, those pixel data values will be transformed. Thus, if it is so arranged that the pixel data values within a range of flesh color of a predetermined image pattern are transformed, both the image pattern and the pixel data values within the pattern will be checked to avoid any erroneous pattern recoginition.

The transforming operation conducted by the printing output processing section 24 may include the following.

a) Reproduction colors that are most preferred by an average viewer are produced by transformation. For example, let us consider transformation of the flesh color of the face of a person. The flesh color of the face will be studied on a large number of people to determine what flesh color is most preferred when printing the face of a person on a recording medium. Then, a data range will be defined for the determined flesh color and the pixel data values of the data range for the flesh color are transformed in advance into flesh color data. It may be needless to say that if the selected flesh color can show a variable width, for example, in terms of color degradation, an identical or similar variable width of color degradation has to be secured after the transformation.
b) Average memory colors are determined and a corresponding data range is selected in advance in place of the most preferred reproduction colors of a) above to obtain the average colors by transformation in place of the most preferred reproduction colors. For this operation, the average memory colors may be obtained directly from the selected image or the colors to be obtained may be determined from the pixel data values of the image data and the selected data range.
c) The above a) and b) may be combined to find an optimal method from the predetermined pattern of the data range.

In addition to the transformation based on the most preferred reproduction colors or the average memory colors, it may be effective to carry out a correcting operation by prearranging certain viewing conditions when the viewer views the image printed by the image printing section including the color temperature of an average light source, the illuminance of the recording medium and the reflectivity of the recording medium and using the prearranged conditions.

Figure 7:
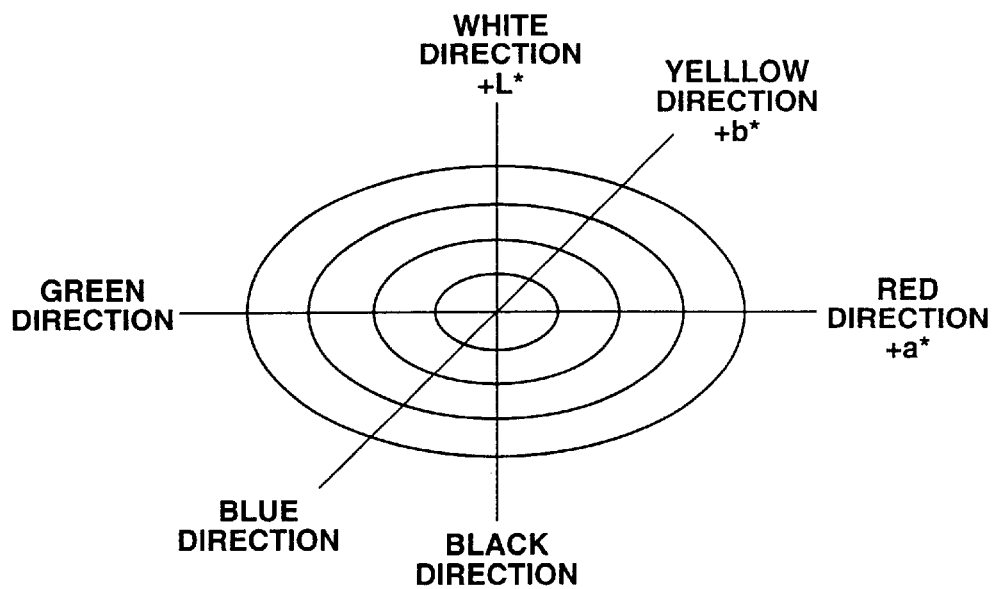
FIG. 7 is a schematic illustration of a CIE L*a*b* uniform color space coordinate system.
Figure 8:
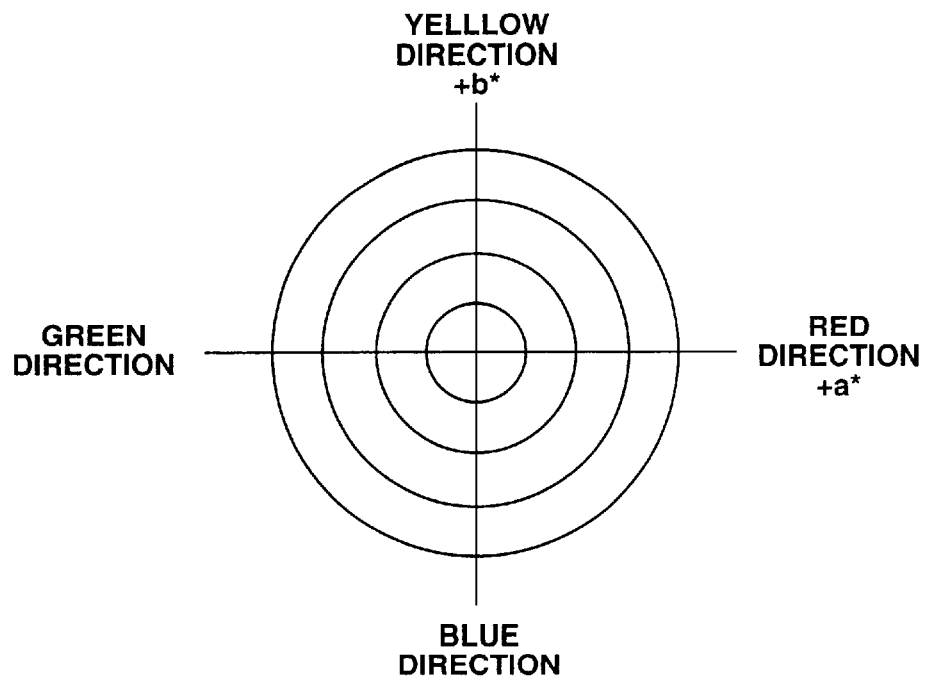
FIG. 8 is a schematic illustration of a plane of a uniform color space coordinate system.

For instance, a transformation method particularly adapted to the selected specific range may be that the input image data are firstly transformed into a uniform color space coordinate system which is typically a CIE L* a* b* coordinate system as illustrated in FIG. 7 and the intended transforming operation is carried out on the coordinate system. Since a colormetric system such as a CIE L* a* b* coordinate system is a three-dimensional coordinate system by nature, a transforming and correcting operation may be conducted on a specific plane intersecting the origin of the three-dimensional space for the purpose of simplifying the related arithmetic operations. FIG. 8 shows a plane passing through the a* b* plane and the L* axis and perpendicularly intersecting the a* b* plane that can be used for the purpose of simplification.

Figure 9A:
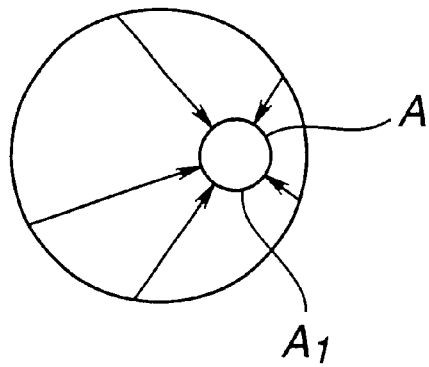
FIGS. 9A, 9B and 9C are schematic illustrations of a color conversion method.
Figure 9B:
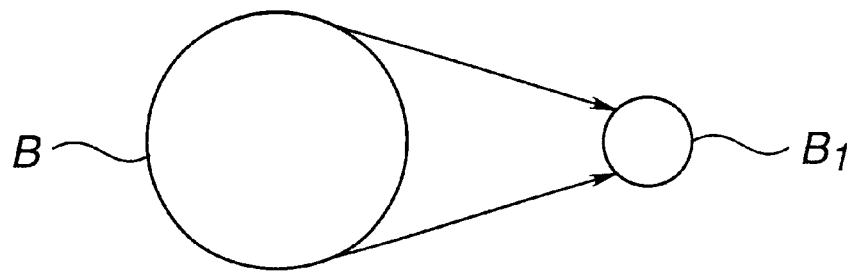
Figure 9C:
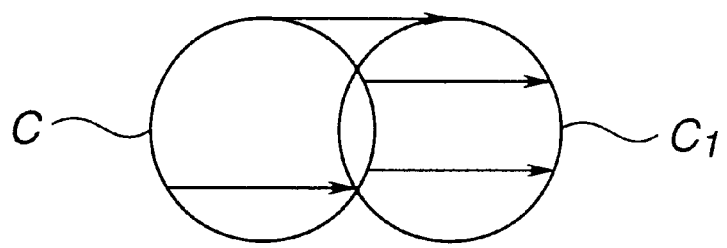

FIG. 9 shows an exemplary method of transformation in a three-dimensional space of a two-dimensional plane. With this method, a three-dimensional space region or a two-dimensional plane region of the image data input to the printing output processing section 24 is transformed in a manner as illustrated in FIG. 9. More specifically, the original space region A may be transformed into a space region $A_1$ that takes part of the original space region A as shown in (a) of FIG. 9 or the original space region B may be transformed into a space region $B_1$ that is separated from the original specimen region B as shown in (b) of FIG. 9. Alternatively, the original space region C may be transformed into a space region $C_1$ that partly overlaps the original space region C as shown in (c) of FIG. 9.

Thus, the image data (which are normally RGB data) are transformed onto a uniform color space coordinate system by the printing output processing section 24 and then the colors are further transformed into preferred reproduction colors and in the coordinate system. Thereafter, the image data are transformed from the uniform color space coordinate system back onto the coordinate system of the original image data (which are normally RGB data). Then, the operation proceeds to the next step.

It is effective to carry out an operation of reproducing preferred colors as described above for the transformation from the RGB system to the CMYK system in the printing output processing section 4. Specifically, it is desirable to prevent any unintended addition of BK color to flesh color in order to beautifully express the flesh color.

As described above, by making the judging method and the processing method conducted in the printing output processing section 24, more specially the sequence and the parameters used in the transformation, variable (writable), it is possible to alter the sequence and the parameters at the time of shipment depending on the expected user of the printer in the destination country. Additionally, with such an arrangement, the user may be able to change any of them at his or her will as the preference of the user changes with time.

Alternatively, a plurality of transformation methods (judging methods and processing methods) may be provided in advance so that any of them may selectively be used depending on the operating conditions of the printer.

If it is expected that the image quality can become to show specific aspects depending on the input environment of image data at the image data input section 1, the transformation method (the judging method and the processing method) may be changed depending on the specific aspects of the image quality.

Additionally, the display device processing section 22 and the video signal processing section 23 determines each of the pixel data values of the first image data and/or the first image data that have been edited and processed and carries out the above described predetermined correcting operation to produce third digital image data.

That is, the display device processing section 22 and the video signal processing section 23 determines each of the pixel data values of the first image data and/or the first image data that have been edited and processed and, if it is found the pixel data value is not found within the predetermined data range, it carries out the above described predetermined processing operation to make the pixel data value found within the predetermined data range to produce third digital image data.

More specifically, it may transform the entire image data or selectively only those pixel data values that are found to be within the predetermined specific data range. Alternatively, it may extract a pattern from the image data and, if the pattern agrees with a predetermined specific pattern, it may selectively transform the data values within the pattern.

The above transforming operation may be conducted by a preselected method. It is effective for improving the quality of the printed image to carry out a predetermined correcting/transforming operation in terms of preferable reproduction colors and average memory colors on the image data of a specific range or area as described above.

The above predetermined operation is preferably an operation of transforming the first digital image data and/or the first digital image data that have been edited into those representing the image quality wanted by the viewer as in the case of the above described printing output processing section 24.

The above predetermined range may refer to the entire image data, part of the image data where the pixel data values are found within a specific data range or part of the image data selected on the basis of the image itself.

Examples of the operation of determining each of the pixel data values within a predetermined range and transforming it will be discussed below.

1) All the pixel data values of the input image data are selected and, if necessary, transformed.
2) Each of the pixel data values of the input image data is determined to be found within or out of a specific data range and only the values found within the data range are selected and transformed.
3) A pattern is extracted from the input image data and, if it is determined that the pattern agrees with a predetermined specific pattern, the pixel data values within the pattern are transformed.
4) Above 2) and 3) are combined. For instance, an image pattern is extracted and checked if it agrees with a predetermined specific pattern. Then, only if it is found that the two patterns agree with each other and the pixel data values in the image pattern are found within a predetermined range, those pixel data values will be transformed.

As described earlier in terms of the printing output processing section 24, it is important for the printer to be able to print an image that can satisfy the user (viewer). Therefore, with a printer according to the invention, the printing output processing section 24 is adapted to carry out a predetermined transforming operation, using the preferred reproduction colors and the average memory colors on the selected pixel data values in a specific range of the image data. When the third digital image data produced by the processing operation of the display device processing section 22 and the video signal processing section 23 is displayed as image on the image display output section, the displayed image should show a quality visually equivalent to that of the image printed on the recording medium when user (viewer) sees them. To this purpose, the display device proc section 22 and the video signal processing section 23 have to carry out a predetermined transforming (judging and processing) operation, using the preferred reproduction colors and the average memory colors on the selected pixel data values in a specific range of the image data as in the case of the printing output processing section 24. Additionally, it may be effective to carry out a correcting operation by prearranging certain viewing conditions when the viewer views the image output the image display output section and the image printed by the image printing section and the image.

However, by comparing the operation of printing an image on the recording medium and that of display an image on the display device 15 or the external monitor, it will be found that the judging and selecting method used for securing a desired image quality for the user and the transforming method often differ between them. This difference is attributable to the difference between viewing an image produced by light reflected from a hard copy (coexistence of an additive mixture of color stimuli and a subtractive mixture of color stimuli) on the recording medium and viewing an image produced by natural light from a soft copy (an additive mixture of color stimuli) on the display device 15 or the external monitor. The difference of reproducible color space between the two copies (normally that of the copy of the natural light device is greater) may also have an effect on it.

Thus, the processing method of the printing output processing section 24 and that of the display device processing section 22 and the video signal processing section 23 are normally not same. The former has to reflect the printing characteristics of the printing output processing section 24, while the latter has to reflect the output characteristics of the display device processing section 22 and the video signal processing section 23. More specifically, the method used for judging the image data, the method used for selecting a range for transformation, the transforming method (which may or may not involve variable parameters) and the sequence of carrying out a plurality of transforming operations (if any) may be different between them.

As in the case of the printing output processing section, by making the judging method and the processing method conducted in the display device processing section 22 and the video signal processing section 23, more specifically the sequence and the parameters used in the transformation, variable (writable), it is possible to alter the sequence and the parameters at the time of shipment depending on the expected user of the printer in the destination country. Additionally, with such an arrangement, the user may be able to change any of them at his or her will as the preference of the user changes with time.

Alternatively, a plurality of transformation methods (judging methods and processing methods) may be provided in advance so that any of them may selectively be used depending on the operating conditions of the printer.

If it is expected that the image quality can become to show specific aspects depending on the input environment of image data at the image data input section 1, the transformation method (the judging method and the processing method) may be changed depending on the specific aspects of the image quality.

If the type of any of the components of the image printing section 3 such as the printing head 25 is altered, the operation parameters of the printing output processing section 24 also have to be altered. Then, those of the display device processing section 22 and the video signal processing section 23 also have to be altered and corrected in order to make the quality of the output image equivalent to that of the image printed by the image printing section 3. Similarly, if the display characteristics of the display device 15 are altered or the type of the external monitor is altered, the operation parameters of the display device processing section 22 and the video signal processing section 23 also have to be altered and corrected. It is preferable that these operation parameters are incorporated in the printer from the beginning.

While the transforming method and the method of selecting the data range to be processed of the printing output processing section 24 and those of the display device processing section 22 and the video signal processing section 23 are different from each other in the above description, it is also possible to make them common to both entirely or partly.

In the above description, a printed image is produced on the recording medium to make it most preferable to the viewer and then an image is displayed in such a way that the quality thereof is equivalent to that of the printed image. It may be needless to say for the purpose of the invention, however, an image may be displayed to make it most preferable to the view and then an image may be printed on the recording medium in such a way that the quality thereof is equivalent to that of the displayed image.

Still additionally, it is not necessary to make the quality of either of the image equivalent to that of the other. Alternatively, both the printed image and the displayed image may be regulated to make their qualities visually equivalent and, at the same time satisfactory to the user (viewer).

In other words, the printing output processing section 24 and the display device processing section 22 and the video signal processing section 23 may carry out concurrently their respective judging and processing operations on the image data. Thus, any of the above described technical options may be used so long as both the displayed image and the printed image are satisfactory to the user (viewer) and their qualities are recognized by the user to be equivalent relative to each other.

Now, the image printing section 3 comprises a printing head drive section 26 and a printing head 25 as principal components thereof. When an image to be printed is selected by the human interface section 28 and a command is issued for printing the image, the printing data that have been subjected to necessary transforming and correcting operations by the printing output processing section 24 of the image processing section 6 are sent to the printing head drive section 26. Then, the printing head drive section 26 transforms the printing data in such a way that a drive voltage, a drive current and a drive waveform good for driving the printing head 25 may be obtained for the printing head 25 and sends the transformed printing data to the printing head 25.

Thus, the operation of the printing head drive section 26 is synchronized with the operation of the printing mechanism for the printing action of the printing head 25, the movement of the printing head 25, the movement of the recording medium; the servicing operation for the printing head 25 and the ink supply. Additionally, an analog electric circuit may be used to for correcting operations necessary to optimize the printing operation from the viewpoint of the environmental conditions of the operation on the basis of the data input from the sensors of the printer including the temperature sensor. If the correcting operations can be carried out by the printing output processing section 24 of the image processing section 6 if they can be processed digitally. The printing head drive section 26 has a configuration that matches the type and the number of printing head (if more than one printing heads are used) used for the printing operation and also the configuration of the printing mechanism.

The printing head 25 may eject recording ink onto the recording medium or cause a recording toner to adhere to the recording medium in order to print an image thereon. For the purpose of the invention, an ink jet printing head as disclosed in Japanese Patent Application Laid-Open No. 7-164656 or No. 8-336990, a recording material trajectory type printing head or a double-fluid mixing type printing head may be used. Additionally, a diffusion type thermal head, the image forming section of a laser beam printer or a recording head of some other type may also be used for the purpose of the invention.

Of these, a recording material trajectory type printing head or a doube-fluid mixing type printing head adapted to full color half tone recording may preferably be used because of the ability of printing a full color image with a high image quality. The printing head may be a line printing head or a serial printing head depending on the width of the printing head. If a line printing head is used, the printing time can be reduced because the recording medium has only to move in a single direction relative to the line printing head. On the other hand, the serial printing head has to move in two directions relative to the recording medium.

While the image data input section 1, the image processing section 6, the image memory 20, the command device 8, the image display output section 2 and the image printing section 3 are integrally arranged to form a main body 21 in the above described printer, the image input means 7 of the image data input section 1 may be arranged separately from the main body. For instance, the film reading section 11 may be connected to the main body by means of a bidirectional interface. Then, it can be made to operate like the one incorporated into the main body as integral part thereof by transmitting and receiving signals from the photoelectric converter and control signal of the reading mechanism. A general purpose interface like an IEEE-1394 interface may be used for the bidirectional interface. When such a general purpose interface is used, the film reading section 11 may be replaced by some other image input means 7 so that communications between them may be controlled by software to make it possible to exchange signals with the image input means 7 by way of the interface.

When the image input means 7 is separated from the main body 21, only the necessary components of the image input means 7 may be connected to the main body to make it possible to down-size the apparatus and the space required for installing the apparatus.

The display device 15 is incorporated into the main body 21 and preferably movable on the main body 21. For instance, it may preferably be held on the cabinet-like main body by way of a support section and rotatable within a predetermined angular range so that the user may easily view it. Alternatively, the display device 15 may be separated from the main body 21 with a physical or electric coupling mechanism interposed therebetween. Then, the user can view the display device 15 at a position remote from the main body 21. While the characteristics including the color tone of the image displayed by the display device 15 are liable to be affected by the surroundings of the device, the influence of the surroundings of the device can be reduced when the display device 21 is made movable on the main body 15 or separated from the main body 15 and remotely arranged.

The command device 8 may also be separated from the main body 21. Then, the user can remotely operate the printer.

When actually printing an image by means of the printing head, an operation as described below typically takes place. Firstly, the human interface section 7 makes the display device 15 and/or the external monitor prompt the user to an input image from the image input means 7 he or she selects. Then, the user selects the image input means 7 to be accessed from the number of image input means 7 by way of the command device 8 in order to take out the image he or she wants to be printed. If the computer interface section 12 is selected, it may be selected by using the host computer 19 in place of the command device 8.

Then, the selected image input means 7 transmits the corresponding digital image data and/or the first digital image data obtained through analog/digital conversion of the analog image signal that is externally input to the image processing section 6 by way of the image data input/output section 27.

The first digital image data are then input to the data processing section 5 of the image processing section 6, which stores the image data in the image memory 20, if necessary, and carries out correcting operations on the image data in order to improve the quality of the image displayed on the display device 15 and/or the external monitor and the image printed by the image printing section 3 if the image data do not show ideal quality characteristics. If the image data show ideal quality characteristics, the data processing section 5 operates to correct and improve the quality of image.

The corrected image data are then output to the display device 15 and/or the external monitor to display an image for the data. If the image data input section 1 has a plurality of accessible sets of image data, each of the sets of image data may be displayed on the display device 15 or the external monitor by way of the image processing section 6 to prompt the user to select the wanted image data under the control of the human interface section 28. Once the image data are selected, the image data input section 1 is accessed to pick up the image data and pickup them into the image processing section 6 if the selected image data are not input yet.

Then, the human interface section 28 asks the user if the selected image data should be edited and processed. If the user wants them to be processed, they will be subjected to necessary processing operations by the image processing section 6 to produce first digital image data.

When all the necessary processing operations are over, the user may want to print an image from the image data under the control of the human interface section 28. Then, the printing output processing section 24 of the image processing section 6 carries out processing operations on the edited and processed first digital image data necessary for producing preferred reproduction colors by transformation to give rise to second digital image data. Additionally, it transforms the image data into printing data and drives the printing head 25 by means of the printing head drive section 26 of the image printing section 3 in order to print an image according to the printing data. In the printing operation, the recording action of the printing head 25 and the action of the recording medium are synchronized.

The edited and processed first digital image data are displayed on the image display output section 2. In this case again, a transforming operation will be conducted to realize preferred reproduction colors in order to make the quality of the image displayed by the display device processing section 22 and the video signal processing section 23 of the image display output section 2 and that of the image printed by the image printing section 3 equivalent.

Figure 10:
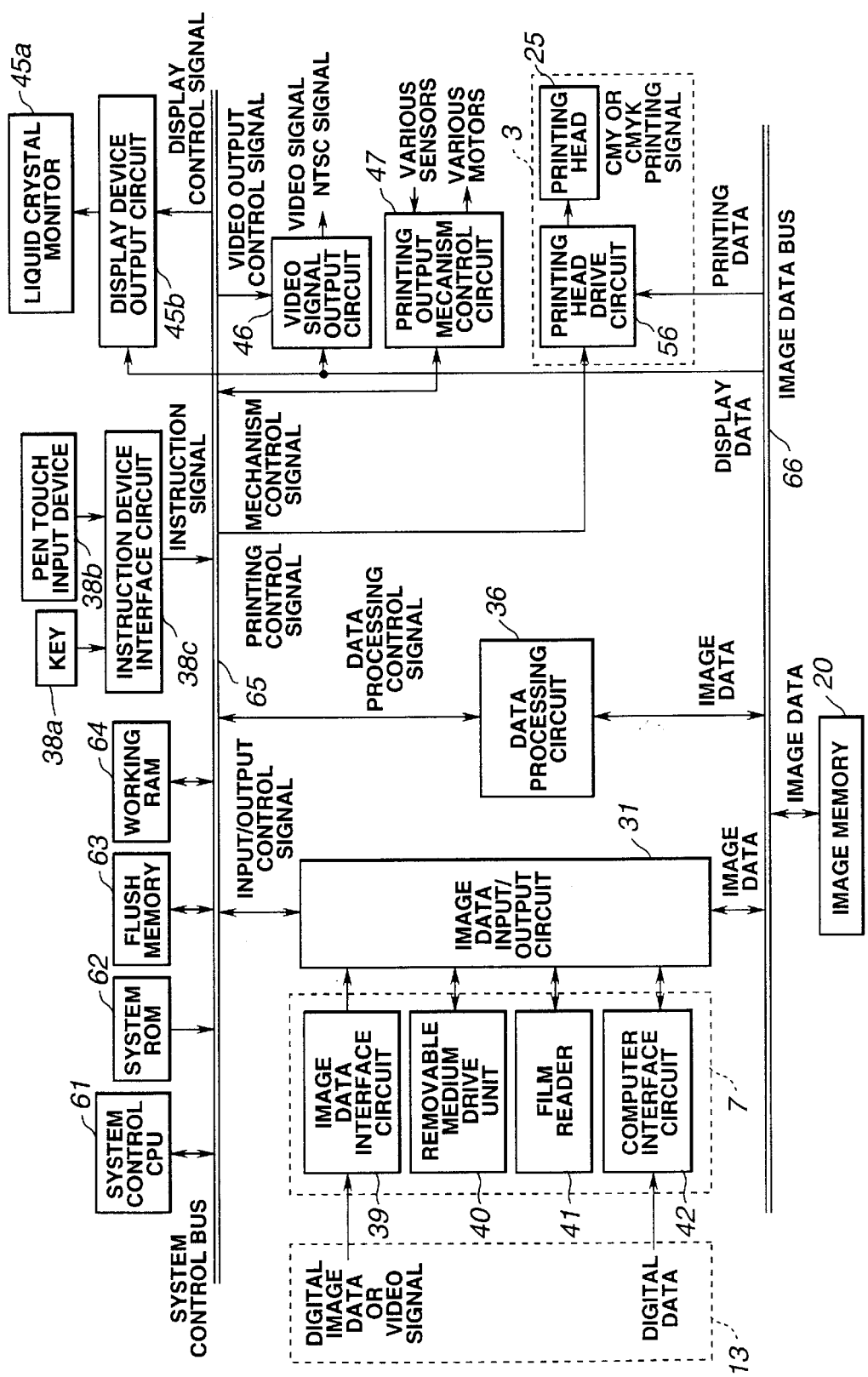
FIG. 10 is a schematic circuit diagram of a printer according to the invention.

FIG. 10 shows a circuit diagram of the printer. It will be appreciated that it has a circuit configuration for accommodating the one or more than one externally connected devices 13, the one or more than one image input means 7, the image data input/output section 27, the image processing section 6, the image display output section 2 and the command device 8 as shown in FIG. 5. More specifically, it comprises an image data input circuit 39, a removable media drive unit 40, a film reading device 41 and a computer interface circuit 42 to correspond to the image input means 7 and an image data input/output circuit 31 to correspond to the image data input/output section 27.

It additionally comprises a data processing circuit 36 to correspond to the image processing section 6 and also internally has a data processing section, display device processing section, video signal processing section and a printing output processing section.

Furthermore, it has a plurality of keys 38a arranged on the printer as command device 8 and a pen-touch type input device 38b arranged on the liquid crystal monitor 45a as display device 15 in order for the user to input commands as well as a command device interface circuit 38c as circuit to correspond to the human interface section 28, which will be discussed hereinafter. The command device interface circuit 38c prevents erroneous inputs that can give rise to chattering phenomena. If a same element of the key 38a or the pen-touch type input device 38b is depressed continuously for a predetermined period of time, it is regarded to be as a plurality of actions of depressing that part and the input is transmitted to the circuit corresponding to the human interface section 28 for the number of times of the actions.

Additionally, there are provide a liquid crystal monitor 45a that corresponds to the display device 15 of the image display output section 2 and a display device output circuit 45b to which the image data in the image memory 29 are transferred so that the menu to be displayed on the liquid crystal monitor 45a and the image to be used for operating the pen-touch type input device are synthetically formed and transformed into a drive signal that can be displayed on the liquid crystal monitor on the basis of the transferred image data and the display control signal transmitted from the circuit corresponding to the human interface section 28, which will be discussed hereinafter.

Still additionally, there is also provided a video signal output circuit 46 adapted to synthetically produce a menu to be displayed on the external monitor and the image to be displayed for operating the pen-touch type input device on the basis of the image data transferred from the image memory 20 and the display control signal from the circuit corresponding to the human interface section 28, which will be discussed hereinafter, and transform them typically into an NTSC signal as standard video signal that can be displayed on the external monitor. The image to be displayed on the liquid crystal monitor 45a and the image to be displayed on the external monitor may be same or different from each other.

Furthermore, there are also provided a printing head drive circuit 56 and a printing head 25 corresponding to the image printing section 3 in addition to a printing output mechanism control circuit 47 that drives various motors and clutches and the head maintenance mechanism according to the mechanism control signal from the software of the system control computer 61 that controls the entire operation of the mechanical section when producing an image on a recording medium such as a sheet of recording paper by means of the printing head 25, receives the outputs of various sensors for detecting the motion of the recording medium and that of the printing head, which outputs are then sent to the system control CPU 61 and carries out other operations of driving the mechanical section and detecting the condition thereof.

The printer further comprises a system control CPU 61 adapted to utilize a working RAM 64 according to the control programs stored in the system ROM 62 or the flush memory 63 and control the entire operation of the printer. The system control CPU 61 operates also as a circuit corresponding to the human interface section 28.

The above identified components are connected mutually by way of a system control bus 65, which system control bus 65 is then connected to the image data input/output circuit 31, the data processing circuit 36, the command device interface circuit 38c, the display device output circuit 45b, the video signal output circuit 46, the printing output mechanism control circuit 47 and the image printing section 3, of which the image data input/output section 31, the data processing section 36, the display device output circuit 45b, the video signal output circuit 46 and the image printing section 3 are also connected to the image data bus 66 of the image memory 20.

It may be so arranged that any of the control programs stored in the flush memory 63 can be replaced from the recording medium drive unit 40 or the computer interface circuit 42 by way of the image input/output circuit 31. If the operation of the data processing circuit 36 requires a control program and the data processing circuit 36 does not contain a ROM or a non-volatile RAM, it may be so arranged that the control program necessary for the data processing circuit 36 may be transferred from the flush memory 63 to the data processing circuit 36. If such is the case, the control program required by the data processing circuit 36 is preferably input from the removable medium drive unit 40 and the computer interface circuit 42 and temporarily stored in the flush memory 63 or the working RAM 64 so that it may be subsequently transferred further to the data processing circuit 36.

The control operations that the system control CPU 61 performs by means of the control program stored in the system ROM 62 or the flush memory 63 include the following. Firstly, the operation of controlling the entire printer. Then, the system control CPU 61 controls the operation of driving the image data interface circuit 39, the removable medium drive unit 40, the film reading device 41 and the computer interface circuit 42 by way of the image data input/output circuit 31, that of handling the image data input by controlling each of the above devices, that of editing, synthetically processing and correcting the image data of the data processing circuit 36, that of displaying an image on the liquid crystal monitor 45a and the external monitor, that of the human interface for controlling the input of operation commands from key 38a and/or the pen-touch type input device 38b and the data output to the liquid crystal monitor 45a and the external monitor and that of the entire image processing section 3 by controlling the printing head drive circuit 56, the printing head 25 and the printing output mechanism control circuit 47.

Thus, it will be understood that, the program and the circuit arrangement of the system control CPU 61 using the mechanism section control programs and the printing output mechanism control circuit 47 will be varied as the profile and the operating method of the printing head, which may be a line head or a serial head, and the method of operating the recording medium vary. In other words, the control program and the control circuit will be defined as a function of the mechanical structure of the printing head 25.

At the time of actually printing an image, the operation proceeds in a manner as described below. The digital image data or the video signal and the digital data input through the one or more than one externally connected devices 13 are transformed into first digital image data by the image data interface circuit 39, the removable medium drive unit 40, the film reading device 41 and the computer interface circuit 42 of the image input means 7 and sent to the image data input/output circuit 31 corresponding to the image data input/output section 27.

Then, the first digital image data are sent to the data processing circuit 36 by way of the image data bus 66 under the control of the input/output control signal from the system control bus 65. It may be needless to say that the system control CPU 61 controls the timing of operation.

Then, the transmitted first digital image data are subjected to a predetermined processing operation by the data processing circuit 36 to become edited and processed first digital image data, which may be stored in the image memory 20 whenever necessary. The command for the predetermined processing operation is input by means of the key 38a and/or the pen-touch type input device 38b and sent to the data processing circuit 36 by way of the command device interface circuit 38c. Again, it may be needless to say that the system control CPU 61 controls the timing of operation.

The edited and processed first digital image data produced through the predetermined processing operation of the data processing circuit 36 are then sent output the display device output circuit 45, the video signal output circuit 46 and the printing head drive circuit 56 for displaying and printing an image. Once again, it may be needless to say that the system control CPU 61 controls the timing of operation.

Figure 11:
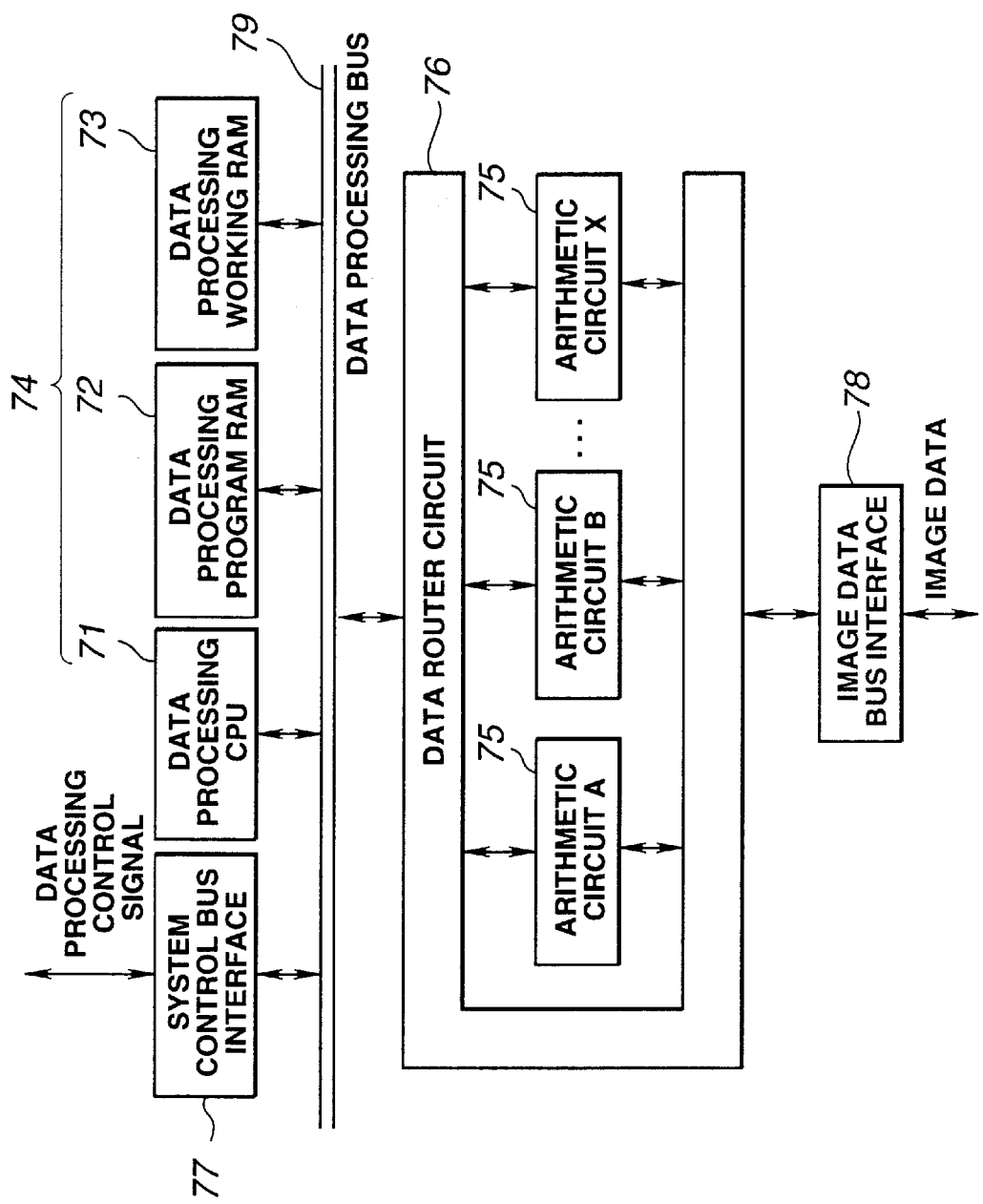
FIG. 11 is a schematic circuit diagram of a data processing circuit that can be used for a printer according to the invention.

Now, a specific examples of the configuration of the data processing circuit 36 will be described. FIG. 11 shows a first example. This example of data processing circuit has a unique data processing control system 74 constituted by a data processing CPU 71, a data processing program RAM 72 and a data processing working RAM 73 along with a plurality of arithmetic circuits 75 that functions identically and a data router circuit 76 for transmitting data to the arithmetic circuits 75 and controls the destinations of the data output from the arithmetic circuits 75. The data router circuit 76 is controlled by the data processing control system 74. Additionally, there is provided a system control bus interface 77 that is controlled by the system control CPU 61 shown in FIG. 10. Furthermore, there is also provided an image data bus interface 78 for controlling the operation of inputting image data to and outputting image data from each of the arithmetic circuits 75.

Thus, the system control bus interface 77 intermediates between the system control CPU 61 and the data processing CPU 71 to make the latter operate under the control of the former and transmits the operational information from the data processing CPU 71 to the system control CPU 61.

With a data processing circuit having a configuration as described above, the operation of processing data is carried out according to the following sequence. Assume here that an operation of processing the image data stored in the image memory 29 is performed and the processed data are stored again in the image memory 20.

Firstly, the data processing program to be used for the operation is transferred from the flush memory 63 or the system ROM 62 of the system control CPU 61 to the data processing program RAM 72 by way of the system control bus interface 77. Then, the system control CPU 61 instructs the data processing CPU 71 to start the data processing operation by way of the system control bus interface 77. The data processing CPU 71 reads out the image data to be processed from the image memory 20 by way of the image data bus interface 78 according to the data processing program transferred to it and inputs them into selected specific one or more than one of the arithmetic circuits 75 that are driven to operate for the processing by way of the data router circuit 76. The selected arithmetic circuits 75 then actually process the input image data according to the data processing program and write the processed image data into the image memory 20 as image data by way of the data router circuit 76 and the image data bus interface 78.

If the next arithmetic operation is conducted successively, the image data to be processed are also input to selected specific one or more than one of the arithmetic circuits 75. In this way, the image data in the image memory 20 are sequentially read out and subjected to an arithmetic processing operation before stored back to the image memory 20 as image data. Thus, the operation proceeds according to the data processing program.

In the course of or after completing the operation of processing the image data, the data processing CPU 71 informs the system control CPU 61 of the status quo or the result, whichever appropriate, of the processing operation by way of the system control bus interface 77 so that the system control CPU 61 is held updated about the current status or the outcome of the processing operation. The data processing working RAM 73 is used to store the data processing parameters transmitted from the system control CPU 61 and the information on the status of the processing operation.

The plurality of arithmetic circuits 75 are designed to operate identically and selectively used depending on the data position in the image. For instance, it may be so arranged that the data of the first column in the image are processed by arithmetic circuit A and the data of the second column in the image are processed by arithmetic circuit B. The columns may be replaced by the rows for the above operation.

However, the plurality of arithmetic circuits 75 may be so designed as to operate differently so that the data processed by a specific arithmetic circuit 75 are entered to another arithmetic circuit 75 by the data router circuit 76 for a different processing operation. With such an arrangement, if the processing operation is to be carried out in a plurality of stages, the image data read out from the image memory 20 can be written back into the image memory 20 after completing all the necessary processing operation on a stage by stage basis to reduce the number of times of accessing the image memory 20.

The method of driving the plurality of arithmetic circuits 75 may be fixed in advance or may be made variable depending on the data processing program. The number of arithmetic circuits 75 connected in parallel is determined as a function of the required processing speed and the size of each of the arithmetic circuits.

Figure 12:
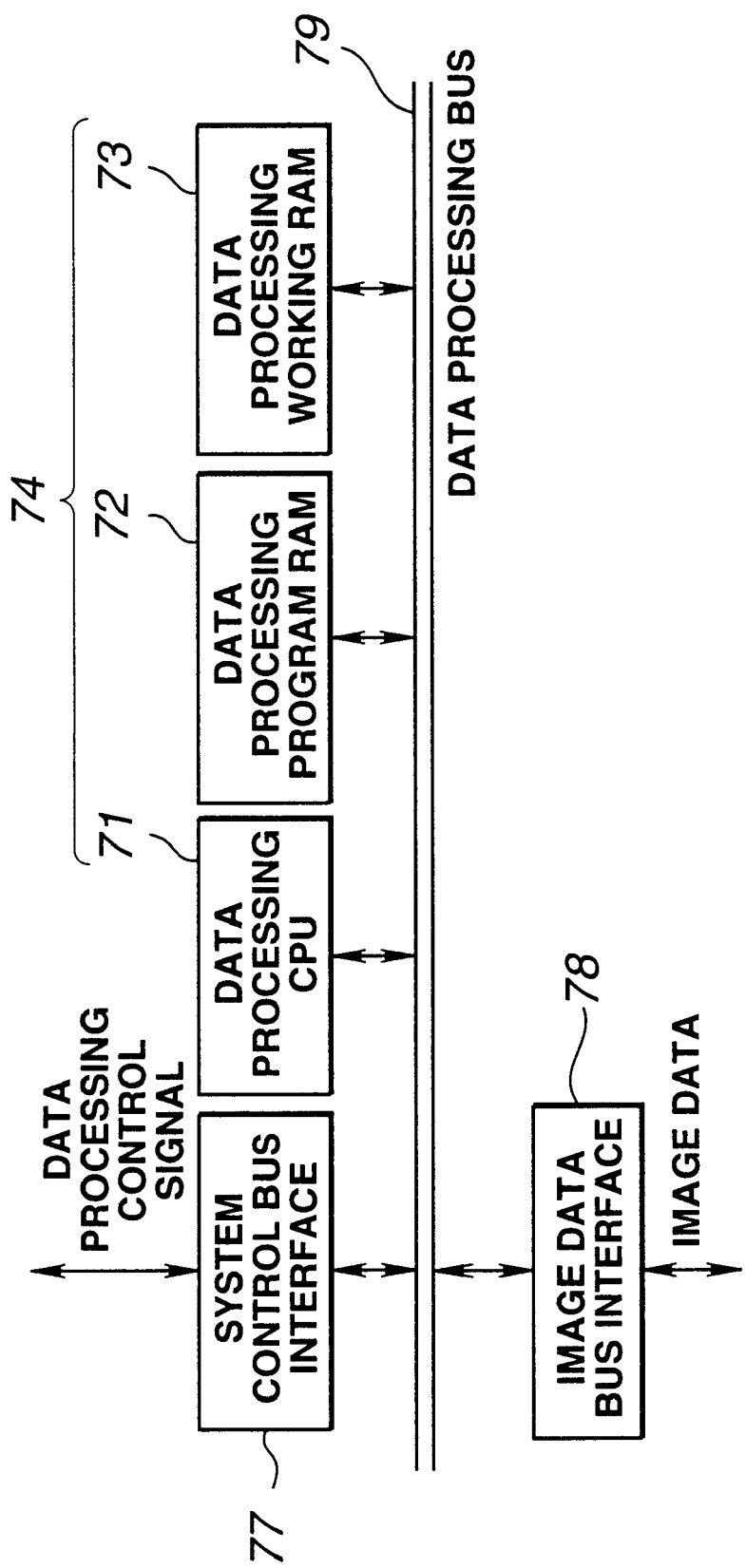
FIG. 12 is a schematic circuit diagram of another data processing circuit that can be used for a printer according to the invention.

FIG. 12 shows a schematic circuit diagram of a data processing circuit that can be used for the purpose of the invention. The data processing circuit of FIG. 12 is same as the data processing circuit of FIG. 11 except that the arithmetic circuits 75 and the data router circuit 76 are removed therefrom. Therefore, the circuit components are denoted respectively by the same reference symbols and would not be described here any further. Note, however, the data processing CPU 71 of FIG. 12 is adapted to high speed operation and may be a DSP, a RISC CPU or a dedicated data processing CPU.

Figure 13:
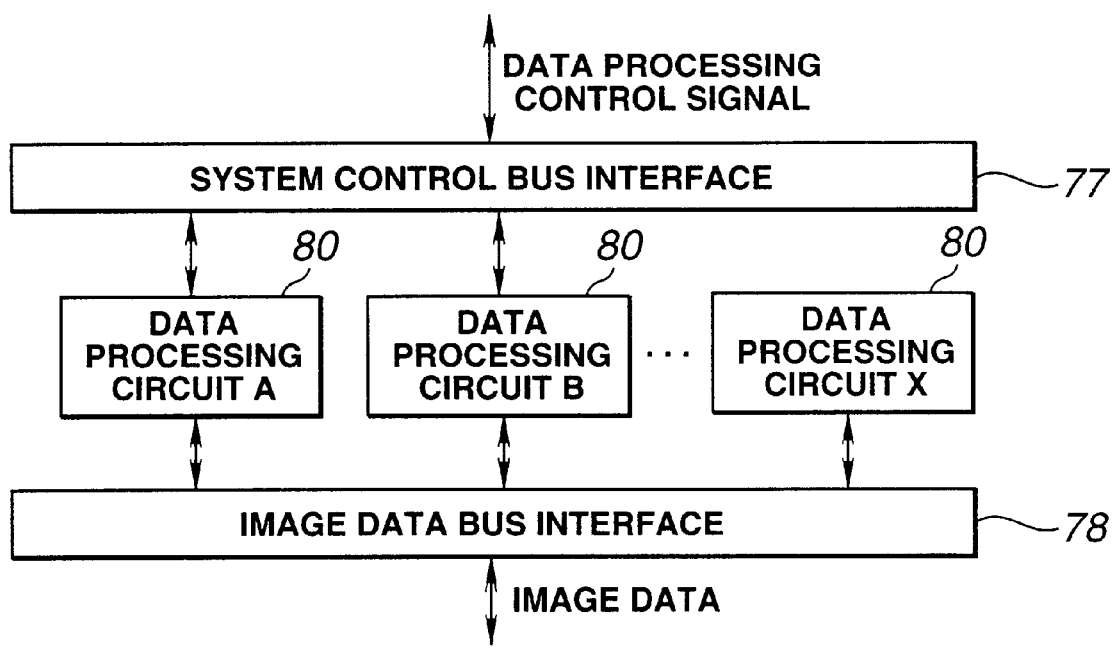
FIG. 13 is a schematic circuit diagram of still another data processing circuit that can be used for a printer according to the invention.

FIG. 13 shows a schematic circuit diagram of another data processing circuit that can also be used for the purpose of the invention. Referring to FIG. 13, a plurality of data processing circuits 80 are connected in parallel and then connected to the control system of the entire apparatus including the system control CPU 61 by way of the system control bus interface 77 and further to the image data bus 66 by way of the image data bus interface 78. Each of the data processing circuits 80 comprises dedicated arithmetic circuits. Alternatively, it may comprise a general purpose arithmetic control circuit comprising general purpose arithmetic circuits. The system control program of the system control CPU 61 controls each of the data processing circuits 80 by way of the system control bus interface 77 so as to process the image data read out from the image memory 20. Like the arithmetic circuits 75 of FIG. 11, it may be so arranged that the data processing circuits 80 carry out a processing operation identically or differently depending on the data arrangement.

Figure 14:
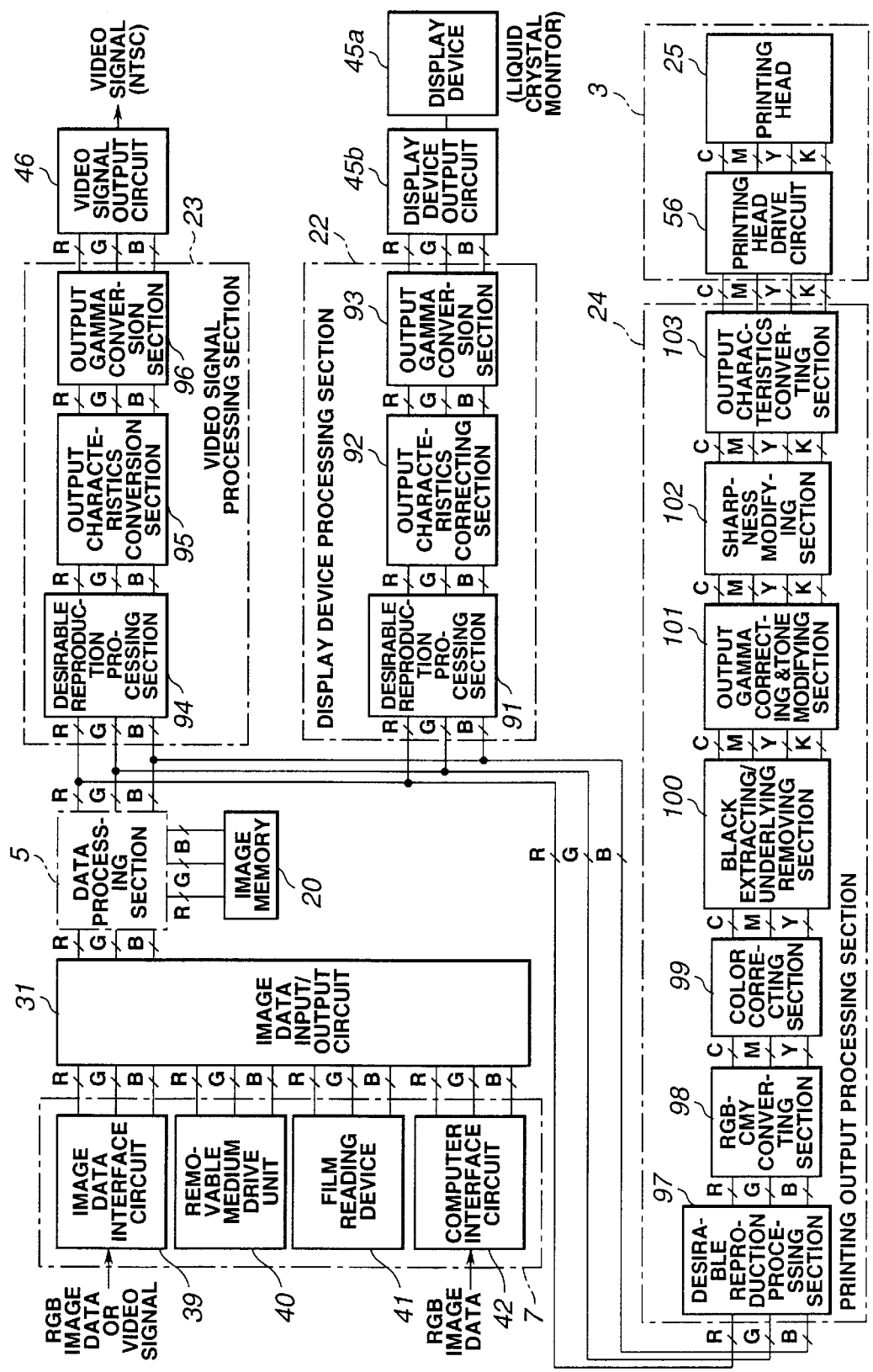
FIG. 14 is a schematic circuit diagram illustrating the flow of a data processing operation that can be used for a printer according to the invention.
Figure 15:
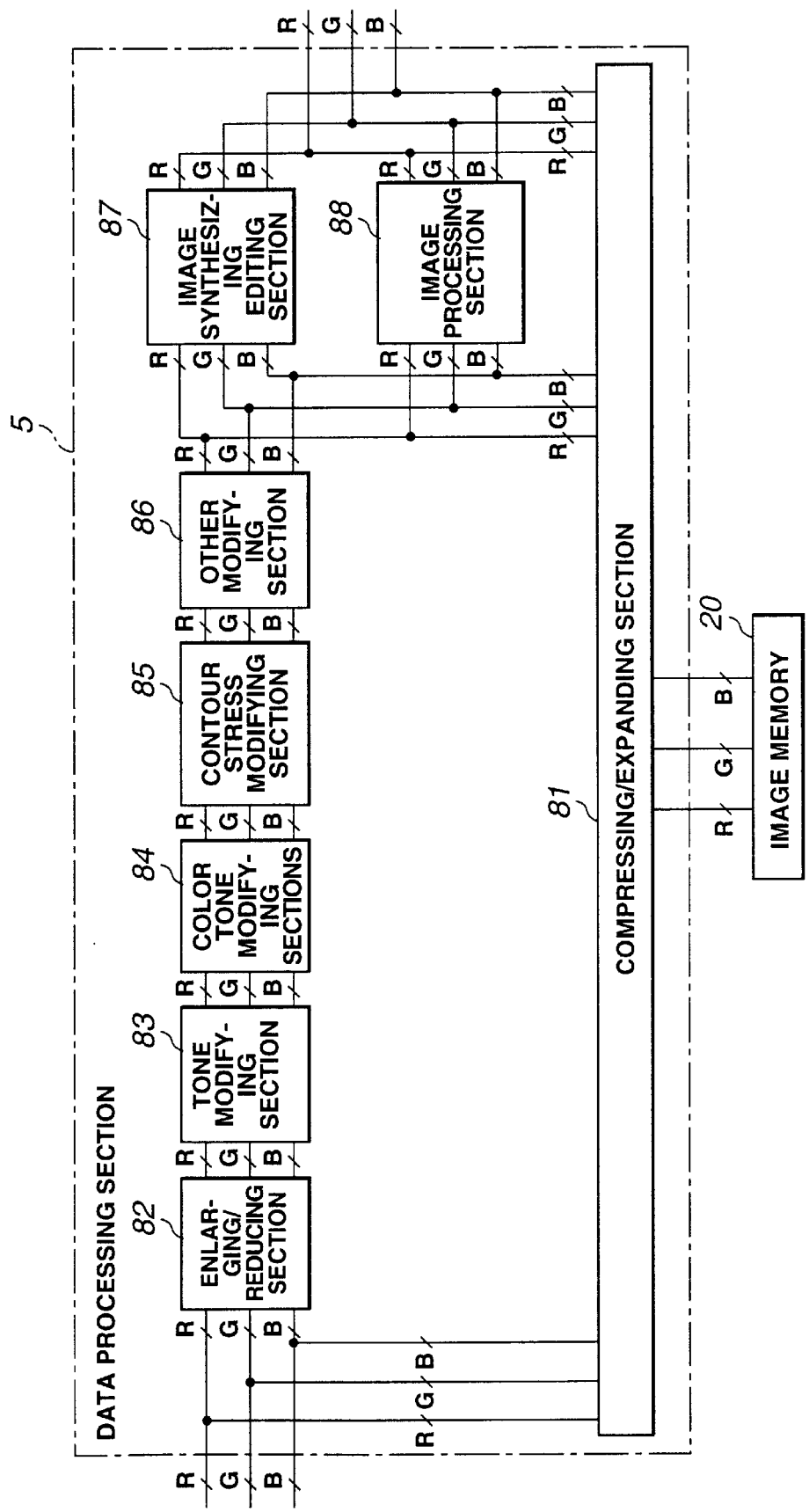
FIG. 15 is a schematic circuit diagram illustrating the flow of a data processing operation in the data processing section of a printer according to the invention.

Now, the flow or operation of processing data in the printer will be discussed by referring to FIGS. 14 and 15. In FIGS. 14 and 15, the slashes on the lines indicating flows of data denote respective 8-bit or more than 8-bit/color data. As described earlier by referring to FIGS. 5 and 10, the RGB image data externally input at the computer interface circuit 42 of the image input means 7 in FIG. 14 are output to the image data input/output circuit 31 as RGB image data and the image data interface circuit 39, the removable medium drive unit 40 and the film reading device 41 of the image input means 7 output the image data or the video signal they read to the image data input/output circuit 31 as RGB image data.

Then, the image data input/output circuit 31 processes the image data input from each of the image input means 7 in such a way that they may be handled uniformly and the processed data are output to the data processing section 5.

As shown in FIG. 15, the data processing section 5 comprises a compressing/expanding section 81, an enlarging/reducing section 82, a tone modifying section 83, a color tone modifying section 84, a contour emphasis modifying section 85, another modifying section 86, an image synthesizing/editing section 87 and an image processing section 88. It corrects image data in order to improve the quality of the image displayed by the display device 45a and the external monitor and that of the image printed by the image printing section 3 when the image data input from the image data input/output circuit 31 do not show ideal characteristics. It carries out a correcting and processing operation for improving the quality of the images when they show ideal characteristics.

The compressing/expanding section 81 is required to be used when storing image data in the image memory 20 in a reversibly or irreversibly compressed form. The RGB image data input to the data processing section 5, the RGB image data processed appropriately and, if necessary, the intermediate RGB image data found between any processing steps are compressed and stored in the image memory 20 as compressed image data, The compressed image data stored in the image memory 20 are read out and expanded to make them uncompressed image data, which are then subjected to various processing operations before output to the related component section(s) of the data processing section 5.

Once input to the data processing section 5, the RGB image data are entered to the enlarging/reducing section 82. The enlarging/reducing section 82 carries out an operation of enlarging or reducing the image of the image data when the input image data is out of the dimensional range that can be handled by the data processing section 5 of the printer.

After the enlarging/reducing section 82, the RGB image data are input to the tone modifying section 83. The tone modifying section 83 modifies the tone characteristics of the input image data to improve the quality of the printed image when the histogram of the tone characteristics of the input image data is biassed remarkably. Particularly, if the exposure to light of the object is not appropriate when it is imaged, the image will be too dark or too light so that the tone characteristics of the entire image will have to be modified and improved. If the gamma characteristics of the input image data can be improved, the gamma characteristic will also be modified.

After the tone modifying section 83, the RGB image data are input to the color tone modifying section 84. As in the case of the tone modifying section 83, the color tone modifying section 84 modifies the color tone characteristics of the input image data to improve the quality of the printed image when the color tone characteristics of the input image data is biassed remarkably. Beside modifying the overall color tone, it is possible to modify the color tone of a particular area of the image if the specific color tone of the area, which may be the color tone of the flesh color or that of the grey color, is out of the normal range.

After the color tone modifying section 84, the RGB data are input to the contour emphasis modifying section 85. The contour emphasis modifying section 85 modifies the contour emphasis to produce clear and appropriate contours in the image when the contours of the image of the input image data are not clear or stressed to strongly.

After the contour emphasis modifying section 85, the RGB image data are input to the other modifying section 86. The other modifying section 86 carries out an additional modifying operation on the input image data to improve the quality of the image.

While the operation of each of the components sections of the data processing section 5 for processing the input image data is described above, some of the above described operations may be omitted and the sequence of the operations may be modified whenever appropriate.

The RGB image data that are processed in a manner as described above by the component sections of the data processing section 5 are then input to the image synthesizing/editing section 87 and the image processing section 88. These component sections carry out various processing operations on the input image according to the command of the user and are used to synthesize and edit a plurality of input images to produce a finished image to be printed.

It is possible to synthetically combine the input image data with a given image pattern by using any of the above component sections. Additionally, it is also possible to input the image pattern requested by the user through the command device, which may be the pen-touch type input device, and synthetically combine it with the input image pattern.

The control program to be used for synthetic, editing and/or otherwise processing operations using image data and the image patterns that are prepared in advance may be input through the removable medium drive unit and the computer interface circuit.

If the display device 45a has specific display output characteristics so that, if the image data output from the data processing section 5 are displayed on the display device 45a without correction, the quality of the displayed image is not high nor equivalent to that of the printed because of the specific display output characteristics of the display device 45a, the display device processing section 22 operates to correct the specific display output characteristics of the display device 45a. The display device processing section 22 comprises a desirable revival processing section 91 and an output characteristics correcting section 92, which will be described hereinafter, in addition to an output gamma conversion section 93 that corrects the specific output gamma characteristics of the display device.

If the display characteristics revival range of the display device 45a differs from that of the printing output and hence the user (viewer) has to confirm the reproduction of the printed image on the display device 45a before starting the printing operation, it will be tragic if the image displayed on the display device 45a and the printed image are different from each other. Therefore, the output characteristics have to be transformed in order to make the printed output and the displayed image show a visually equivalent image quality.

The video signal processing section 23 transforms the image data output from the data processing section 5 into a standard video signal such as an NTSC signal. The video signal processing section 23 comprises a desirable revival processing section 94 and an output characteristics correcting section 95 for carrying out necessary correcting operations other than those for correcting the gamma characteristics, which will be described hereinafter, in addition to an output gamma conversion section 96. If the range of the expressible characteristics of the input image data differs from the that of the standard video signal, the video signal processing section 23 corrects the range of the expressible characteristics of the image data to make it agree with the range of the expressible characteristics of the standard video signal. The standard video signal may be a quasi standard video signal for the purpose of the invention.

The printing output processing section 24 transforms the image data output from the data processing section 5 into a signal (printing data) that can be input to the printing head drive circuit 56 in order to record the image data on the recording medium by means of the printing head 25. The processing operation of the printing output processing section 24 includes transforming operations using an LUT (look-up table), arithmetic operations using the arithmetic circuits that can carry out arithmetic operations at high speed, arithmetic operations performed by a program containing a high speed arithmetic algorithm and/or operations performed by a dedicated transformation circuit. When arithmetic operations are performed sequentially, the effective accuracy of data can be degraded if the number of bits of each input image data is used without modifying it. In such a case, the effective accuracy of data can be maintained by increasing the number of bits of each intermediary image data from the number of bits of the first image data in the course of arithmetic operation and reducing the number of bits of the last image data to make the both ends meet.

The printing output processing section 24 comprises a desirable revival processing section 97, which will be described hereinafter, an RGB-CMY converting section 98, a color correcting section 99, a black extracting/underlying color removing section 100, an output gamma correcting & tone modifying section 101, a sharpness modifying section 102 and an output characteristics converting section 103, although some of the above component sections may be omitted and/or one or more than one additional component sections may be introduced to alter the configuration thereof.

The RGB-CMY converting section 98 transforms the RGB image data into data for the colors of the inks or toners of C(cyan), M(magenta) and Y(yellow). This transformation can be realized by means of gray scale Log transformation, compensatory color transformation or linear masking transformation.

The image data now in the form of CMY image data are then input to the color correcting section 99. The color correcting section 99 corrects the color tone (hue and saturation in particular) produced by the image printing section 3 because the spectral absorption characteristics of the each of the CMY inks or toners differs from the ideal characteristics obtained by subtractive mixture of color stimuli.

The operations of the color correcting section 99 include transformation using an LUT (look-up table) and arithmetic operations, linear masking arithmetic operations and non-linear masking arithmetic operations. Since the maximum expressible range of the image data can more often than not differ from the maximum expressible range of the image printed on the recording medium by the printing head 25, the portion of the expressible range of the image data that exceeds the expressible range of the printed image cannot be used if the maximum expressible range of the image data is broader than that of the printed image. Therefore, the color correcting section 99 may have to compress and transform the entire image data or clip and transform some of the image data by using a method that does not give rise to any color tone discrepancy as a result of the transformation.

Then, the CMY image data are input to the black extracting/underlying color removing section 100. If the printing head 25 has black ink or black toner (hereinafter referred to as BK ink or BK toner) and the CMY image data contain a BK element, the black extracting/underlying color removing section 100 replaces the BK element with BK ink or BK toner. Subsequently, it removes the BK element from the CMY image data.

Various techniques may be used for replacing the BK element in the CMY image data with BK ink or BK toner. For example, the entire BK element may be replaced or only a predetermined proportion thereof may be replaced. Alternatively, a portion thereof exceeding a certain gray scale level may be replaced. With this technique of using BK ink or BK toner for the BK element of the CMY image data, the black areas of image that cannot be satisfactorily expressed by CMY inks or toners can be expressed satisfactorily. Note that the data for the BK element are denoted by K in FIG. 14.

Then, the CMYK image data are input to the output gamm correcting & tone modifying section 101. If the printing output characteristics of the printing head 25 are specific on the recording medium because of the recording ink or toner and the half tone reproduction technique, the output gamma correcting & tone modifying section 101 carries out output gamma correcting & tone modifying operations suited to the printing output characteristics.

Then, the CMYK image data are input to the sharpness modifying section 102, which improve the quality of the printed image by carrying out processing operations of contour emphasis and smoothing.

Then, the CMYK image data are input t the output characteristics converting section 103. The output characteristics converting section 103 improves the quality of the printed image by carrying out correcting operations specific to the type of the printing head 25, the method of driving the printing head 25, the type of the recording medium and the type of the ink or toner. More specifically, the operations include correction of the surrounding temperature during the printing operation, correction of the thermal history, correction of the variances of the elements of the printing head 25. Of the correcting operations, those that are most suitably carried out by the printing head drive circuit 56 may be taken over by the printing head drive circuit 56.

Thus, as pointed out above, the display device processing section 22, the video signal processing section 23 and the printing output processing section 24 respective comprise the desirable revival processing section 91, the desirable revival processing section 94 and the desirable revival processing section 97. The desirable revival processing sections 91, 94, 97 carry out transforming operations in order to make the displayed image or the image printed on the recording medium agreeable to may viewers.

If the original image data are transformed into CMY data only to make both of them colorimetrically equivalent (and show equal calorimetric values when observed by a colorimeter) for the purpose of reproducing the original image, the colors in particular, most of the viewers will not be satisfied by the color reproduction (hue, lightness and saturation) and feel that the colors are poorly saturated and hence not very agreeable. Thus, the desirable revival processing section 97 analyses the RGB image data input from the data processing section 5 and transforms them into image data contained within a specific data range in order to achieve the preferred reproduction colors or the average memory colors.

Therefore, the desirable revival processing section 97 of the printing output processing section 24 carries out the above described processing operations on the RGB image data that have been transformed in advance on the basis of the preferred reproduction colors or the average memory colors and the image printing section 3 prints an image from the processed image data. It may be needless to say that, if the desirable revival processing section 97 does not any processing operation, the input image data are used for printing.

At the same time, both the desirable revival processing section 91 of the display device processing section 22 and the desirable revival processing section 94 of the video signal processing section 23 the RGB image data input from the data processing section 5 and transforms them into image data contained within a specific data range in order to achieve the preferred reproduction colors or the average memory colors.

More specifically, in the display device processing section 22 and the video signal processing section 23, the desirable revival processing sections 91, 94 carry out the above described processing operations on the RGB image data that have been transformed in advance on the basis of the preferred reproduction colors or the average memory colors and the display device 45a and/or the external monitor display an image for the image data. It may be needless to say that, if the desirable revival processing sections 91, 94 do not any processing operation, the input image data are used for the display.

Thus, with the printer, both the image printed by the image printing section 3 and the image displayed on the display device 45 and/or the external monitor are those processed for desirable revival. Therefore, by appropriately determining the processing operation for desirable revival, the quality of the printed image can be made equivalent to that of the displayed image.

Figure 16:
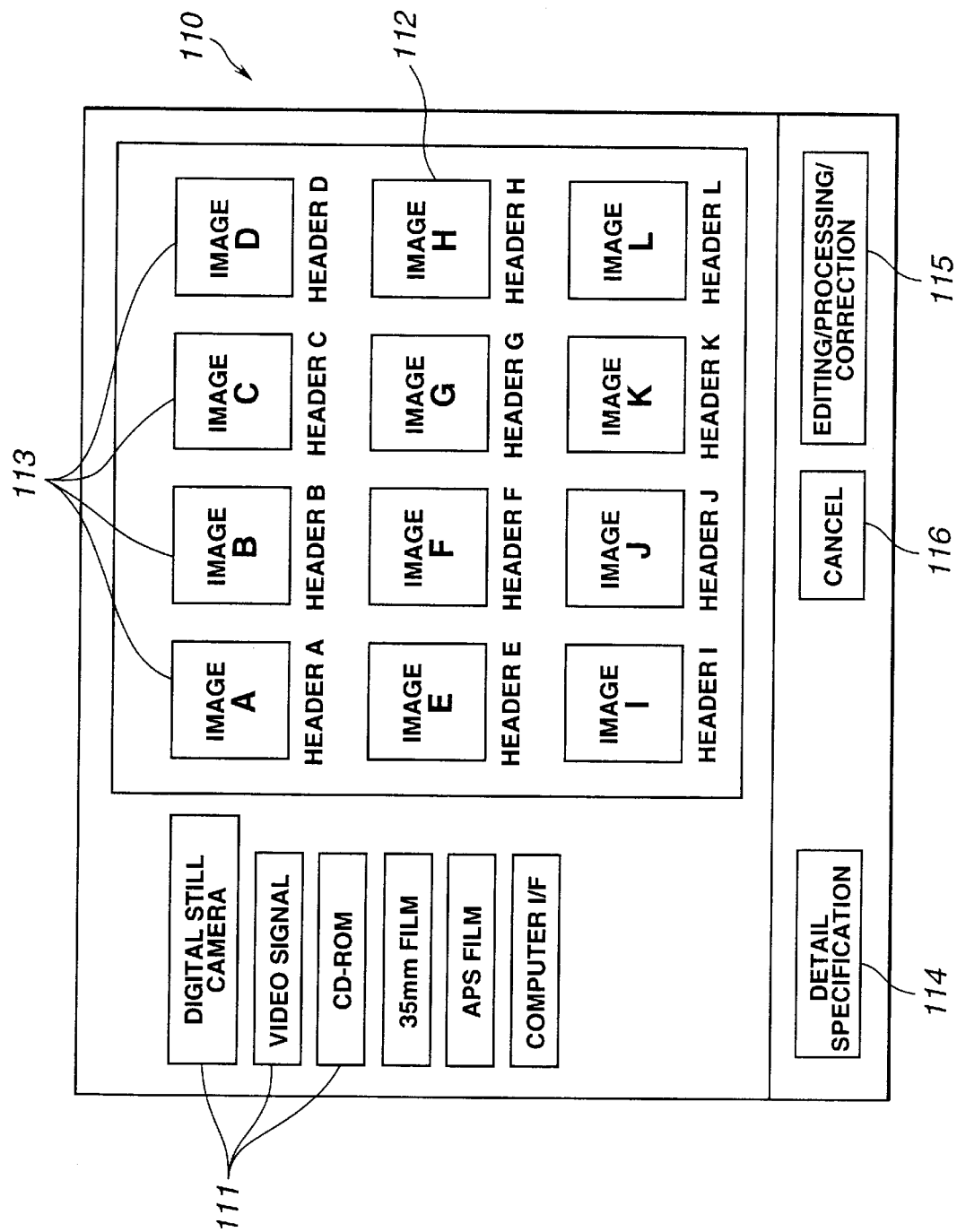
FIG. 16 is a schematic illustration of an image that can be displayed on the display screen of the display device of a printer according to the invention or that of an external monitor.

The display device 15 and the external monitor display a menu in a manner as described below. FIG. 16 show a screen 110 showing a typical first page of the menu. It is assumed here that an input operation is realized by directly touching a related area of the screen. As shown in FIG. 16, the screen 12 displays a plurality of selection keys carrying the denominations of the types of processing operation for selecting the externally connected devices and the image input means as well as a large image display zone 112. If the externally connected devices and the image input means are selected by the corresponding selection keys 111, the accessible image 113 by the selected means is displayed on the image display zone 112 with reduced dimensions.

The screen 110 also displays a detail specification key 114 to be used for selecting an image 113 that meets specific requirements, an editing/processing/correction key to be used for editing and processing the selected image 113 and a cancel key 116 for cancelling the current processing operation.

Firstly, as the user select one of the externally connected devices and the image input means by means of the selection keys 111, a plurality of images 113 that can be read in are displayed on the image display zone 112. If there are data annexed to the displayed images 113 such as those on headers, they are also displayed on the image display zone 112.

Then, as the user selects the image 113 he or she wants from the plurality of images 113 being displayed, the selected image 113 will be highlighted.

Various requirements can be selected by depressing the detail specification key 114. Therefore, the user may select an image by specifying requirements such as the day and the time when the image was shot.

Predetermined editing/processing/synthesizing/correcting operations can be carried out by using the editing/processing/correction key 115 so that the user may carry out a desired operation on the selected image 113.

The type of operation to be carried out on the selected image is preferably displayed on the screen. Then, as shown in (a) of FIG. 17, the selected image 117, a plurality of processing selection keys 118 indicating processing A, processing B, processing C, . . . , processing X, a print key 119 for starting a printing operation and a cancel key 120 for cancelling the ongoing operation are displayed on the screen.

Thus, the user carries out a desired processing operation on the image 117 by selecting the processing selection key 11 8 for the operation. Then, the image 117 will indicate that a processing operation is going on and then shows the result of the processing operation.

For starting a processing operation from a specific part of the image 117, the processed area of the image 117 can be visually confirmed if the part being processed is indicated on the screen as the part will be shifted with time as the operation proceeds.

Such a processing operation may or may not involve variable parameters.

Assume here that processing A involves variable parameters. Then, as shown in (b) of FIG. 17, it may be sufficient for the screen 110 to display the image 117, the processing display section 121 indicating the current processing operation, the selection key 122 for returning to the immediately preceding image (image shown in (a) of FIG. 17) and the cancel key 123 along with a variable parameter specifying zone 126, a decide key 127 for deciding the processing operation.

Figure 17A:
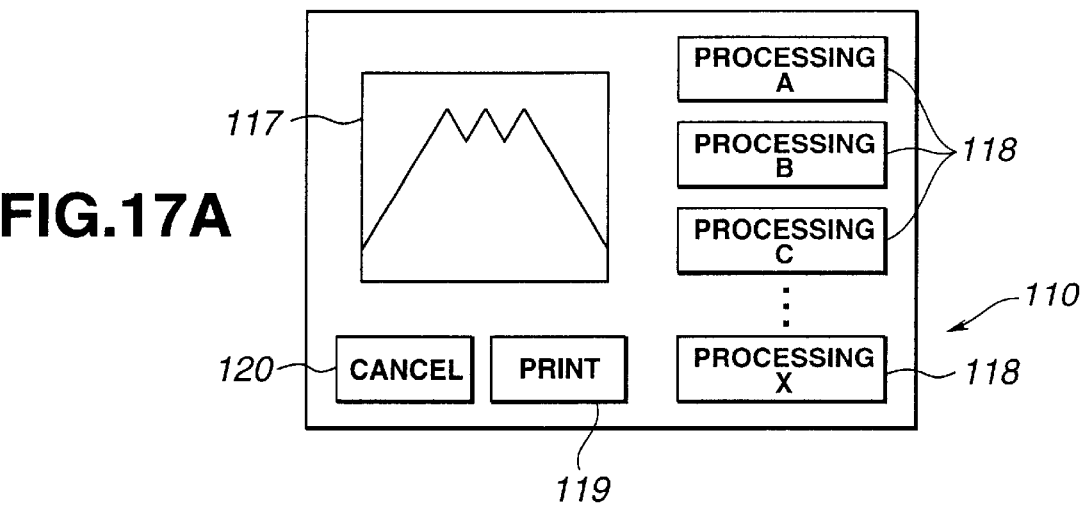
FIG. 17 is a schematic illustration of another image that can be displayed on the display screen of the display device of a printer according to the invention or that of an external monitor.
Figure 17B:
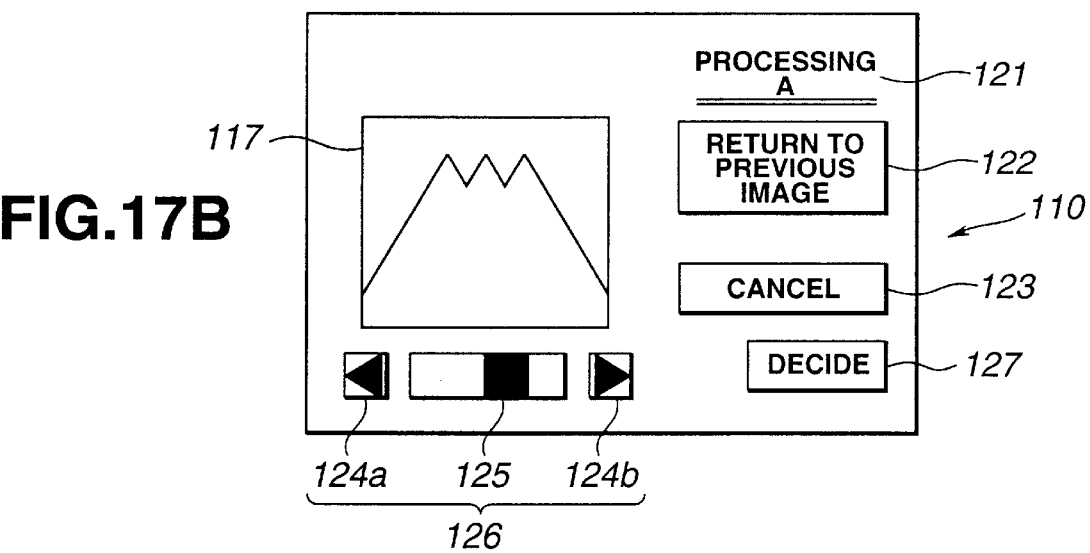
Figure 17C:
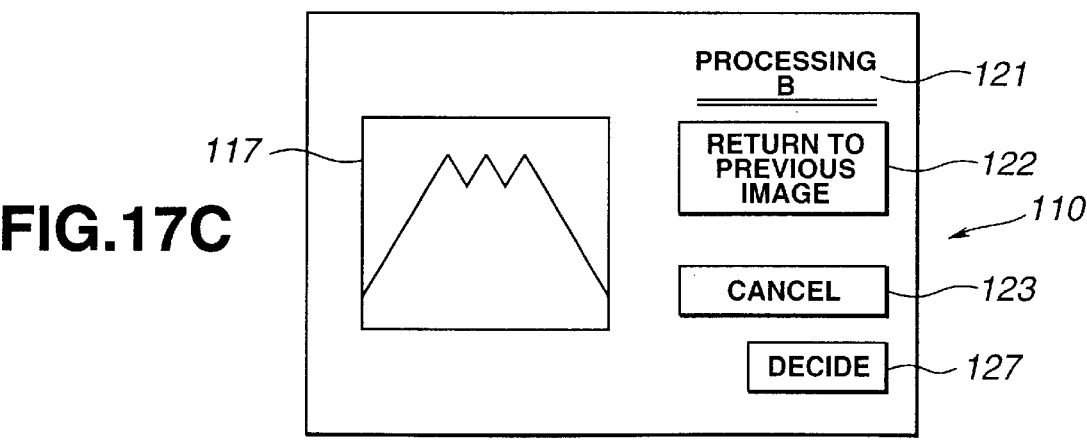

As seen from (b) in FIG. 17, the variable parameter selection zone 126 includes a sliding volume display section 125 for display the level of the variable parameter being selected and adjust keys 124a, 124b for increasing and decreasing the variable parameter respectively. When the left adjust key 124a in the screen of (b) in FIG. 17 is depressed, the level of the variable parameter is shifted leftward, whereas, when the right adjust key 124b in the screen of (b) in FIG. 17 is depressed, the level of the variable parameter is shifted rightward. If, for example, the left adjust key 124a in (a) of FIG. 17 is the key for reducing the lightness and the right adjust key 124b in (a) of FIG. 17 is the key for raising the lightness, the lightness of the image can be varied by using the adjust keys 124a, 124b and varying the level of the sliding volume display section 125.

Assume, on the other hand, that processing B does not involve variable parameters. Then, it may be sufficient for the screen 110 to display the image 117, the processing display section 121 indicating the current processing operation, the selection key 122 for returning to the immediately preceding image (image shown in (a) of FIG. 17) and the cancel key 123 along with a decide key 127 for deciding the processing operation.

As the processing operation as shown in (a) and (b) of FIG. 17 is carried out and the user is sure that the processing operation should be terminated, he or she will select the decide key 127. If the user wants to print an image, he or she will return to the screen of (a) in FIG. 17 and selects the print key 119 to start the printing operation.

Now, the operation of the printer will be described by referring to the flow charts of FIGS. 18, 19 and 20.

Figure 18:
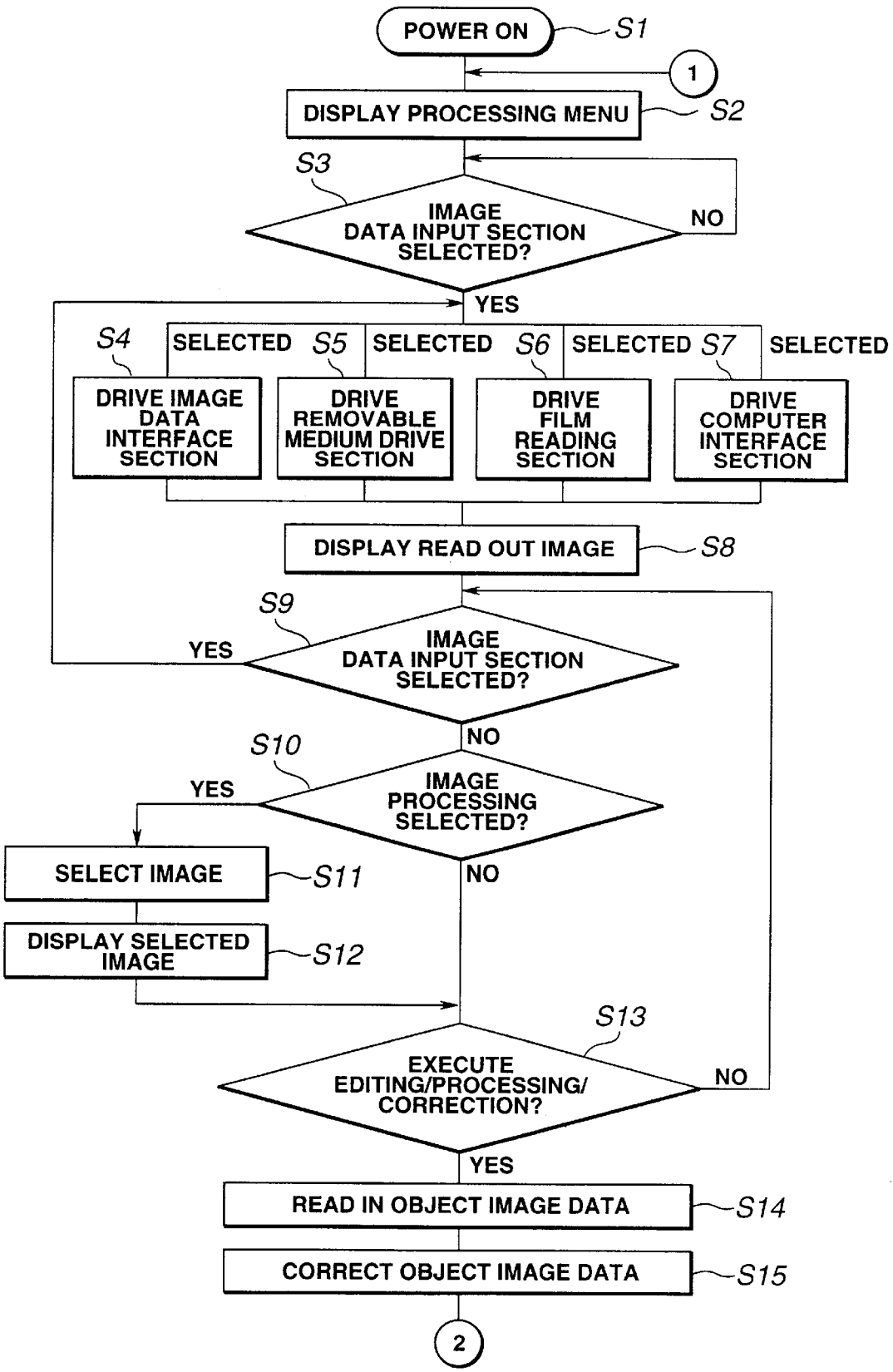
FIG. 18 is a flow chart of a part of the overall operation of a printer according to the invention.

Firstly, as shown in FIG. 18, the power switch is turned ON in Step S1. Then, a processing menu as shown in FIG. 16 is display on the screen in Step S2. Then, in Step S3, it is determined which image input means and which externally connected devices are selected to input image data. Then, the selected means will be put to use. In Step 4, the image data interface section is driven. Since there are a plurality of image input means and externally connected devices for inputting image data, the corresponding recording medium drive section is driven in Step S5. In Step S6, the film reading section is driven whereas, in Step S7, the computer interface section is driven. Note that one of the Steps S4 through S7 will be selected according to the selection of Step S3.

If, on the other hand, neither the image input means nor the externally connected devices are selected in Step S3, the processing operation of Step S3 will be repeated to determine which image input means and which externally connected devices are selected to input image data.

As described above, the image data output from the image input means or the externally connected device selected in any of Steps S4 through S4 are then displayed on the display device or the external monitor. At this time, if a plurality of image data are output from the selected image input means or the externally connected monitor, the plurality of image data are displayed on the display device or the external monitor in the form of a plurality of dimensionally reduced images.

Then, in Step S9, it is determined if the image input means or the externally connected device that has been selected should be changed or not for entering image data. If not change is indicated relative to the image input means or the externally connected device for entering image data, what image should be selected for a processing operation is asked in Step S10. The processing operation here refers to an editing/processing/correcting operation of the image processing section or a printing operation of the image printing section including various steps thereof.

If none of the plurality of images is selected and it is indicated that the image input means or the externally connected device should be changed, the image input means or the externally connected device to be used for entering image is selected again in Step S9 and the operation proceeds to the appropriate one of Steps S4 through S7.

Then, in Step 511, the image selected in response to Step S10 is confirmed and, in Step S12, the selected image is displayed.

Then, in Step S13, it is determined if a command for an editing/processing/correcting operation is issued for the selected image or not and, if it is found that a command is issued, the image data of the selected image are read in Step S14.

If, on the other hand, if the answer to the question is no and no image is selected for processing, the operation simply proceeds to Step S13.

If it is found in Step S13 that no command is issued for an editing/processing/correcting operation, the operation returns to Step S9, where it is determined if the image input means or the externally connected device that has been selected should be changed or not for entering image data.

In Step S15, the image data read in for an editing/processing/correcting operation in Step S14 are actually corrected. The correcting operation here is that of improving the quality of the image display on the display device or the external monitor and that of the image printed by the image printing section if the image data do not show ideal image quality characteristics.

Figure 19:
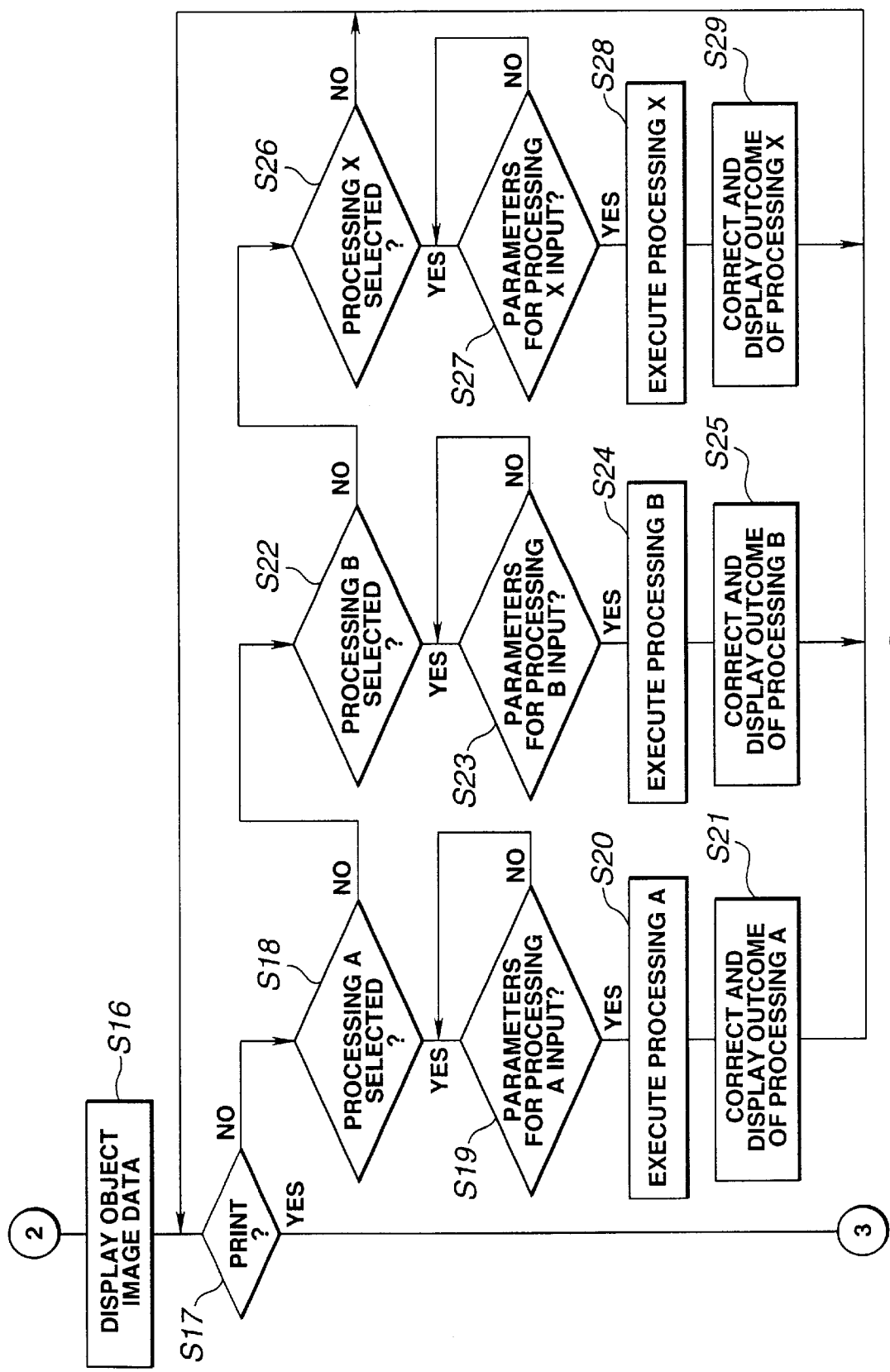
FIG. 19 is a flow chart of another part of the overall operation of a printer according to the invention.

After the correcting operation, in Step S16 shown in FIG. 19, the image that is displayed and corrected in a manner as shown in (a) of FIG. 17 is displayed. Then, in Step S17, it is determined if a command for printing is issued or not.

If it is found that no command is issued for printing, it is then determined if there is a command issued for each of the various processing operations. More specifically, in Step S18, it is determined if processing A is to be executed or not. If it is found that processing A is to be executed, input of the variable parameter relating to processing A is prompted in Step S19. When the variable parameter is input, processing A is actually executed in Step S20 and the outcome of the execution of processing A is displayed by the image display output section in Step S21. If no input is made in response to the prompt for input of the variable parameter relating to processing B in Step S19, the operation waits for input of the variable parameter relating to processing A.

If no command is issued in Step S18 for executing processing A, it is determined, in Step S22, if processing B is to be executed or not. If it is found that processing B is to be executed, input of the variable parameter relating to processing B is prompted in Step S23. When the variable parameter is input, processing B is actually executed in Step S24 and the outcome of the execution of processing B is displayed by the image display output section in Step S25. If no input is made in response to the prompt for input of the variable parameter relating to processing B in Step S23, the operation waits for input of the variable parameter relating to processing B.

Similar steps will be followed for other processings and finally, in Step S26, i tis determined if processing X is to be executed or not. If it is found that processing X is to be executed, input of the variable parameter relating to processing X is prompted in Step S27. When the variable parameter is input, processing X is actually executed in Step S28 and the outcome of the execution of processing X is displayed by the image display output section in Step S29. If no input is made in response to the prompt for input of the variable parameter relating to processing X in Step S27, the operation waits for input of the variable parameter relating to processing X.

In this way, it is sequentially determined if a printing operation is to be performed, if processing A is to be executed, if processing B is to be executed, . . . , and if processing X is to be executed.

Then, the operation returns to Step S17, where it, is determined if a command for printing is issued for the image data for which the above steps have been taken in the above described manner. If a plurality of processings have been selected, the image for which processing A has been executed are returned to Step S17 but no command will be issued for printing nor any command is issued for processing A in Step S18 so that the operation proceeds to Step S22. Then, the image for which processing B has been executed are returned to Step S17 but no command will be issued for printing nor no command is issued for processing B. Thus, when all the selected processings have been executed, the command for printing will be issued in Step S17.

Figure 20:
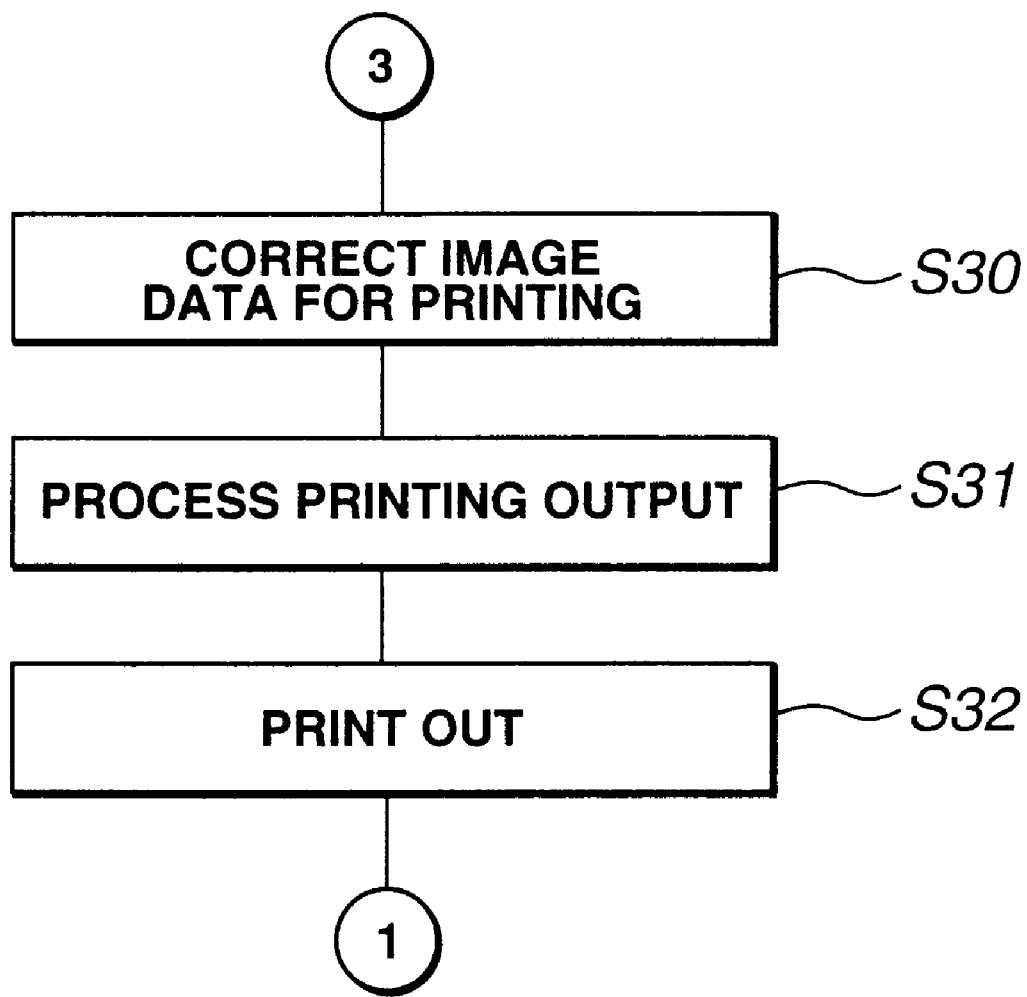
FIG. 20 is a flow chart of still another part of the overall operation of a printer according to the invention.

If it is determined in Step S 17 that the command for printing is issued, an operation of correcting the colors of the image to be printed to the preferred reproduction colors is carried out in Step S30 shown in FIG. 20. Subsequently, in Step S3 1, a processing operation necessary for printing is carried out and, in Step S32, an image is actually printed out. If the printing operation is to be continued, the menu is displayed once again in Step S2 of FIG. 18 and the above operation will be repeated.

The image data is corrected to make the image display output section display an image showing the most preferred reproduction colors and the corrected image data are displayed.

Thus, with a printer according to the invention, various operations can be carried out in a simple manner and hence the printing can be handled with ease. Additionally, a same operation can be used regardless of the type of image input means so that the user can easily become accustomed to the operation.

What is claimed is:

1. A printer comprising:
   an image data input section adapted to convert externally input digital image data and/or an analog image signal into first digital image data by analog/digital conversion;
   an image printing correcting section for determining if pixel data values of said first digital image data is found within a predetermined range of said first digital image data, which are determined by contents of said first digital image data used to represent a specific image pattern, is found within a predetermined data range of predetermined reproduction colors and predetermined average memory colors, by means of predetermined judging methods and carrying out, whenever necessary, predetermined processing operations for defining the quality of the image to be displayed and printed for incorporating each of the pixel data values found within the predetermined range of said first digital image data into the predetermined data range to produce second digital image data;

wherein the predetermined range will refer to the entire image data, part of the image data where the pixel data values are found within the predetermined data range or part of the image data selected on the basis of the image data itself, depending on preferences of a user selecting one of said predetermined judging methods;

a printing output processing section for carrying out a printing output processing operation for converting said second digital image data into printing data for printing an image in an image printing section;

an image printing section for printing an image as output on a recording medium according to said printing data;

an image display output correcting section for determining if each of the pixel data values found within the predetermined range of said first digital image data is found within the predetermined data range by means of said predetermined judging methods and carrying out, whenever necessary, said predetermined processing operations for incorporating each of the pixel data values found within the predetermined range of said first digital image data into the predetermined data range to produce third digital image data; and an image display output section for displaying said third digital image data as output;

said image printing correcting section being adapted to determine if each of the pixel data values found within the predetermined range of said first digital image data input by way of the image data input section is found within the predetermined data range and, if it is determined that said pixel data values are not found within the predetermined range, carry out said predetermined processing operations for incorporating each of the pixel data values found within the predetermined range of said first digital image data into the predetermined data range to produce second digital image data before sending them to the printing output processing section;

said image display output correcting section being adapted to determine if each of the pixel data values found within the predetermined range of said first digital image data input by way of the image data input section is found within the predetermined data range and, if it is determined that said pixel data values are not found within the predetermined range, carry out predetermined processing operations for incorporating each of the pixel data values found within the predetermined range of said first digital image data into the predetermined data range to produce third digital image data before sending them to the image display output section.

2. A printer according to claim 1, wherein said predetermined range of said first digital image data entirely covers the first digital image data.

3. A printer according to claim 1, wherein said predetermined range of said first digital image data covers the pixel data values of a predetermined range out of the pixel data values of the first digital image data.

4. A printer according to claim 1, wherein said predetermined range of said first digital image data is determined by the image corresponding to the first digital image data.

5. A printer according to claim 1, wherein said judging method for determining if each of the pixel data values found within a predetermined range of said first digital image data is found within a predetermined data range and said processing operation for making each of the pixel data values found within the predetermined range of said first digital image data found within a predetermined range differ between said image printing correcting section and said image display output correcting section.

6. A printer according to claim 1, wherein the level of saturation of the pixel data values of the second digital image data generated by said image printing correcting section is higher than that of the pixel data values of the third digital image data generated by said image display output correcting section.

7. A printer according to claim 1, wherein said judging method for determining if each of the pixel data values found within a predetermined range of said first digital image data is found within a predetermined data range and said processing operation for making each of the pixel data values found within the predetermined range of said first digital image data found within a predetermined range are made variable.

8. A printer according to claim 7, wherein said judging method is selected from a plurality of different judging method to make it variable.

9. A printer according to claim 7, wherein said processing operation is selected form a plurality of different processing operations to make it variable.

10. A printer according to claim 7, wherein said judging method is made variable by selecting variable parameters.

11. A printer according to claim 7, wherein said processing operation is made variable by selecting variable parameters.

* * * * *